United States Patent
Mola

(10) Patent No.: US 10,459,824 B2
(45) Date of Patent: Oct. 29, 2019

(54) CACHE-BASED TRACE RECORDING USING CACHE COHERENCE PROTOCOL DATA

(71) Applicant: MICROSOFT TECHNOLOGY LICENSING, LLC, Redmond, WA (US)

(72) Inventor: Jordi Mola, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/915,930

(22) Filed: Mar. 8, 2018

(65) Prior Publication Data
US 2019/0087305 A1 Mar. 21, 2019

Related U.S. Application Data

(60) Provisional application No. 62/559,780, filed on Sep. 18, 2017.

(51) Int. Cl.
*G06F 12/08* (2016.01)
*G06F 11/36* (2006.01)
*G06F 12/0815* (2016.01)
*G06F 11/34* (2006.01)

(52) U.S. Cl.
CPC ........ *G06F 11/364* (2013.01); *G06F 11/3476* (2013.01); *G06F 11/3632* (2013.01); *G06F 11/3636* (2013.01); *G06F 12/0815* (2013.01); *G06F 11/3624* (2013.01); *G06F 11/3664* (2013.01)

(58) Field of Classification Search
CPC ............... G06F 12/0815; G06F 11/364; G06F 11/3636; G06F 11/3632; G06F 11/3476; G06F 11/3624; G06F 11/3664
See application file for complete search history.

(56) References Cited

U.S. PATENT DOCUMENTS

| | | |
|---|---|---|
| 4,598,364 A | 7/1986 | Gum et al. |
| 5,381,533 A | 1/1995 | Peleg et al. |
| 5,905,855 A | 5/1999 | Klaiber et al. |
| 5,944,841 A | 8/1999 | Christie |
| 6,009,270 A | 12/1999 | Mann |

(Continued)

FOREIGN PATENT DOCUMENTS

| | | |
|---|---|---|
| WO | 2013147898 A1 | 10/2013 |
| WO | 2017028908 A1 | 2/2017 |

OTHER PUBLICATIONS

"7 Recording Inferior's Execution and Replaying It", Retrieved From: https://web.archive.org/web/20161009233228/https://sourceware.org/gdb/onlinedocs/gdb/Process-Record-and-Replay.html, Retrieved on: May 27, 2016, 6 Pages.

(Continued)

*Primary Examiner* — Hiep T Nguyen
(74) *Attorney, Agent, or Firm* — Workman Nydegger

(57) ABSTRACT

Performing a cache-based trace recording using cache coherence protocol (CCP) data. Embodiments detect that an operation that causes an interaction between a cache line and a backing store has occurred, that logging is enabled for a processing unit that caused the operation, that the cache line is a participant in logging, and that the CCP indicates that there is data to be logged to a trace. Embodiments then cause that data to be logged to the trace, which data is usable to replay the operation.

20 Claims, 16 Drawing Sheets

(56) References Cited

U.S. PATENT DOCUMENTS

| | | | |
|---|---|---|---|
| 6,094,729 A | 7/2000 | Mann | |
| 6,101,524 A | 8/2000 | Choi et al. | |
| 6,167,536 A | 12/2000 | Mann | |
| 6,351,844 B1 | 2/2002 | Bala | |
| 6,634,011 B1 | 10/2003 | Peltier et al. | |
| 6,728,949 B1 | 4/2004 | Bryant et al. | |
| 6,854,108 B1 | 2/2005 | Choi | |
| 7,055,070 B1 | 5/2006 | Uhler et al. | |
| 7,089,400 B1 | 8/2006 | Pickett et al. | |
| 7,178,133 B1 | 2/2007 | Thekkath | |
| 7,181,728 B1 | 2/2007 | Thekkath | |
| 7,448,025 B2 | 11/2008 | Kalafatis et al. | |
| 7,620,938 B2 | 11/2009 | Edwards et al. | |
| 7,676,632 B2 | 3/2010 | Miller | |
| 7,877,630 B1 | 1/2011 | Favor et al. | |
| 7,958,497 B1 | 6/2011 | Lindo et al. | |
| 8,010,337 B2 | 8/2011 | Narayanan et al. | |
| 8,423,965 B2 | 4/2013 | Goel et al. | |
| 8,468,501 B2 | 6/2013 | Subhraveti | |
| 8,484,516 B2 | 7/2013 | Giannini et al. | |
| 8,499,200 B2 | 7/2013 | Cathro | |
| 8,612,650 B1 | 12/2013 | Carrie et al. | |
| 8,719,796 B2 | 5/2014 | Rosu et al. | |
| 9,015,441 B2 | 4/2015 | Worthington et al. | |
| 9,058,415 B1 | 6/2015 | Serebrin et al. | |
| 9,268,666 B2 | 2/2016 | Law et al. | |
| 9,300,320 B2 | 3/2016 | Ansari et al. | |
| 9,361,228 B2 | 6/2016 | Turner et al. | |
| 9,535,815 B2 | 1/2017 | Smith et al. | |
| 9,569,338 B1 | 2/2017 | Bradbury et al. | |
| 9,767,237 B2 | 9/2017 | Suresh et al. | |
| 10,031,833 B2 | 7/2018 | Mola | |
| 10,031,834 B2 | 7/2018 | Mola | |
| 2002/0124237 A1 | 9/2002 | Sprunt et al. | |
| 2002/0144101 A1 | 10/2002 | Wang et al. | |
| 2003/0079205 A1 | 4/2003 | Miyao et al. | |
| 2003/0126508 A1 | 7/2003 | Litt | |
| 2004/0117690 A1 | 6/2004 | Andersson | |
| 2004/0139305 A1 | 7/2004 | Arimilli et al. | |
| 2005/0155019 A1 | 7/2005 | Levine et al. | |
| 2005/0223364 A1 | 10/2005 | Peri et al. | |
| 2006/0112310 A1 | 5/2006 | Mchale et al. | |
| 2006/0230390 A1 | 10/2006 | Alexander et al. | |
| 2007/0106827 A1 | 5/2007 | Boatright et al. | |
| 2007/0130237 A1 | 6/2007 | Altman et al. | |
| 2007/0150881 A1 | 6/2007 | Khawand et al. | |
| 2007/0214342 A1 | 9/2007 | Newburn et al. | |
| 2007/0220361 A1 | 9/2007 | Barnum et al. | |
| 2008/0065810 A1 | 3/2008 | Spanel et al. | |
| 2008/0091867 A1 | 4/2008 | Plondke et al. | |
| 2008/0114964 A1 | 5/2008 | Davis et al. | |
| 2008/0115113 A1 | 5/2008 | Codrescu et al. | |
| 2008/0215920 A1 | 9/2008 | Mayer et al. | |
| 2008/0250207 A1 | 10/2008 | Davis et al. | |
| 2008/0256396 A1 | 10/2008 | Giannini et al. | |
| 2008/0288826 A1 | 11/2008 | Nemoto | |
| 2009/0037886 A1 | 2/2009 | Mccoy et al. | |
| 2009/0144742 A1 | 6/2009 | Subhraveti et al. | |
| 2010/0205484 A1 | 8/2010 | Dragicevic et al. | |
| 2010/0250856 A1 | 9/2010 | Owen et al. | |
| 2010/0251031 A1 | 9/2010 | Nieh et al. | |
| 2010/0268995 A1 | 10/2010 | Goodman et al. | |
| 2011/0271070 A1 | 11/2011 | Worthington et al. | |
| 2011/0276761 A1 | 11/2011 | Saha et al. | |
| 2011/0288847 A1 | 11/2011 | Narayanan et al. | |
| 2012/0095728 A1 | 4/2012 | Ubukata | |
| 2013/0036403 A1 | 2/2013 | Geist | |
| 2013/0086567 A1 | 4/2013 | Inoue et al. | |
| 2014/0059523 A1 | 2/2014 | Frazier et al. | |
| 2014/0281710 A1 | 9/2014 | Cain et al. | |
| 2014/0372987 A1 | 12/2014 | Strong et al. | |
| 2015/0089155 A1 | 3/2015 | Busaba et al. | |
| 2015/0089301 A1 | 3/2015 | Laurenti | |
| 2015/0212940 A1 | 7/2015 | Fowles et al. | |
| 2015/0355996 A1 | 12/2015 | Smith et al. | |
| 2015/0378870 A1 | 12/2015 | Marron et al. | |
| 2016/0292061 A1 | 10/2016 | Marron et al. | |
| 2017/0052876 A1 | 2/2017 | Svensson et al. | |
| 2017/0140082 A1 | 5/2017 | Suresh et al. | |
| 2017/0161173 A1 | 6/2017 | Bradbury et al. | |
| 2018/0060214 A1 | 3/2018 | Mola | |
| 2018/0060215 A1 | 3/2018 | Mola | |
| 2018/0113789 A1* | 4/2018 | Mola | G06F 11/3636 |
| 2018/0113806 A1* | 4/2018 | Mola | G06F 12/0811 |
| 2018/0113809 A1* | 4/2018 | Mola | G06F 11/36 |
| 2018/0314623 A1 | 11/2018 | Mola | |
| 2019/0065339 A1* | 2/2019 | Mola | G06F 11/3476 |

OTHER PUBLICATIONS

"Non-final Office Action Issued in U.S. Appl. No. 15/349,555", dated Oct. 6, 2017, 22 Pages.

"Elm's Time Traveling Debugger", Retrieved From: https://web.archive.org/web/20160522023348/http://debug.elm-lang.org/, Retrieved on: May 22, 2016, 4 Pages.

"IntelliTrace", Retrieved From: https://web.archive.org/web/20160521122918/https://msdn.microsoft.com/en-us/library/dd264915.aspx, Retrieved Date: May 21, 2016, 5 Pages.

"rr: Lightweight Recording & Deterministic Debugging", Retrieved From: https://web.archive.org/web/20160521063109/https://rr-project.org/, Retrieved on: May 21, 2016, 4 Pages.

"Non-Final Office Action Issued in U.S. Appl. No. 15/252,998", dated Sep. 20, 2017, 15 Pages.

"Non-final Office Action Issued in U.S. Appl. No. 15/253,027", dated Oct. 10, 2017, 25 Pages.

"Notice of Allowance Issued in U.S. Appl. No. 15/253,027", dated Mar. 21, 2018, 13 Pages.

"Notice of Allowance Issued in U.S. Appl. No. 15/349,555", dated Mar. 29, 2018, 21 Pages.

Barr, et al., "TARDIS: Affordable Time-Travel Debugging in Managed Runtimes", in Proceedings of the International Conference on Object Oriented Programming Systems Languages & Applications, Oct. 20, 2014, 16 Pages.

Bhansali, et al., "Framework for Instruction-level Tracing and Analysis of Program Executions", in Proceedings of the 2nd International Conference on Virtual Execution Environments, Jun. 14, 2006, pp. 154-163.

Brady, Fiorenza, "Cambridge University Study States Software Bugs Cost Economy $312 Billion Per Year", Retrieved From: http://www.prweb.com/releases/2013/1/prweb10298185.htm, Jan. 8, 2013, 4 Pages.

Charles, "Arun Kishan: Inside Windows 7—Farewell to the Windows Kernel Dispatcher Lock", Retrieved From: https://channel9.msdn.com/shows/Going+Deep/Arun-Kishan-Farewell-to-the-Windows-kernel-Dispatcher-Lock/, Aug. 6, 2009, 9 Pages.

Dimitrov, et al., "Time-Ordered Event Traces: A New Debugging Primitive for Concurrency Bugs", in Proceedings of IEEE International Parallel & Distributed Processing Symposium (IPDPS), May 16, 2011, pp. 311-321.

Guo, et al., "R2: An Application-Level Kernel for Record and Replay", In Proceedings of the 8th USENIX Symposium on Operating Systems Design and Implementation, Dec. 8, 2008, pp. 193-208.

Hower, et al., "Two Hardware-Based Approaches for Deterministic Multiprocessor Replay", Published in Communications of the ACM, vol. 52, Issue 6, Jun. 1, 2009, pp. 93-100.

Jiang, et al., "CARE: Cache Guided Deterministic Replay for Concurrent Java Programs", in Proceedings of the 36th International Conference on Software Engineering, May 31, 2014, 11 Pages.

King, et al., "Debugging Operating Systems With Time-Traveling Virtual Machines", in Proceedings of Annual USENIX Technical Conference, Apr. 10, 2005, pp. 1-15.

Kleen, Andi, "Adding Processor Trace Support to Linux", Retrieved From: https://lwn.net/Articles/648154/, Jul. 1, 2015, 7 Pages.

Lai, et al., "A Versatile Data Cache for Trace Buffer Support", In Journal of IEEE Transactions on Circuits and Systems, vol. 61, Issue 11, Nov. 2014, pp. 3145-3154.

(56) References Cited

OTHER PUBLICATIONS

Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.

Liang, et al., "Improved Procedure Placement for Set Associative Caches", In Proceedings of the International Conference on Compilers, Architectures and Synthesis for Embedded Systems, Oct. 24, 2010, pp. 147-156.

Liang, et al., "Instruction Cache Locking Using Temporal Reuse Profile", In Proceedings of the 47th Design Automation Conference, Jun. 13, 2010, pp. 344-349.

Mercer, et al., "Model Checking Machine Code with the GNU Debugger", In Proceedings of the 12th International Conference on Model Checking Software, Aug. 22, 2005, 15 Pages.

Xu, et al., "ReTrace: Collecting Execution Trace with Virtual Machine Deterministic Replay", In Proceedings of the Third Annual Workshop on Modeling, Benchmarking and Simulation, Jan. 1, 2007, 8 Pages.

Narayanasamy, et al., "BugNet: Continuously Recording Program Execution for Deterministic Replay Debugging", Proceedings of the 32nd Annual International Symposium on Computer Architecture, Jun. 4, 2005, 12 Pages.

"International Search Report and Written Opinion Issued in PCT Application No. PCT/US2017/048094", dated Nov. 10, 2017, 12 Pages.

"International Search Report and Written Opinion Issued in PCT Application No. PCT/US2017/060075", dated Feb. 28, 2018, 11 Pages.

Rivers, et al., "Utilizing Reuse Information in Data Cache Management", In Proceedings of the 12th International Conference on Supercomputing, Jul. 13, 1998, pp. 449-456.

Sahuquillo, et al., "The Filter Cache: A Run-Time Cache Management Approach", in Proceedings of 25th Euromicro Conference, Sep. 8, 1999, 8 Pages.

Shaaban, et al., "Improving Trace Cache Hit Rates Using the Sliding Window Fill Mechanism and Fill Select Table", In Proceedings of the Workshop on Memory System Performance, Jun. 8, 2004, pp. 36-41.

Sharma, Suchakrapani Datt., "Hardware Tracing with Intel Processor Trace", Retrieved From: http://hsdm.dorsal.polymtl.ca/system/files/10Dec2015_0.pdf, Dec. 10, 2015, 30 Pages.

Tchagou, et al., "Reducing Trace Size in Multimedia Applications Endurance Tests", In Proceedings of Design, Automation & Test in Europe Conference & Exhibition (Date), Mar. 9, 2015, 2 Pages.

Uzelac, et al., "Hardware-Based Load Value Trace Filtering for On-the-Fly Debugging", In Proceedings of ACM Transactions on Embedded Computing Systems, vol. 12, Issue 2, Article 97, May 2013, 18 pages.

"International Search Report and Written Opinion Issued in PCT Application No. PCT/US2018/038875", dated Sep. 6, 2018, 13 Pages.

"International Search Report and Written Opinion Issued in PCT Application No. PCT/US19/015056", dated Aug. 5, 2019, 13 Pages.

\* cited by examiner

*600c*

| ID | UNIT BITS | | | | INDEX | FLAG |
|---|---|---|---|---|---|---|
| 0  | 1 | 0 | 0 | 0 | 0  | 1 |
| 1  | 1 | 1 | 0 | 0 | 1  | 1 |
| 2  | 1 | 0 | 0 | 0 | 0  | 1 |
| 3  | 1 | 1 | 0 | 0 | 1  | 1 |
| 4  | 1 | 0 | 0 | 0 | 0  | 1 |
| 5  | 1 | 0 | 1 | 0 | 2  | 1 |
| 6  | 1 | 1 | 1 | 0 | 1  | 1 |
| 7  | 1 | 1 | 1 | 0 | 1  | 1 |
| 8  | 0 | 0 | 0 | 0 | -1 | 0 |
| 9  | 0 | 0 | 0 | 0 | -1 | 0 |
| 10 | 0 | 0 | 1 | 0 | 2  | 1 |
| 11 | 0 | 1 | 1 | 0 | 1  | 1 |
| 12 | 1 | 1 | 1 | 0 | 0  | 1 |
| 13 | 0 | 0 | 0 | 0 | -1 | 0 |

| ID | P0 | P1 | P2 |
|---|---|---|---|
| 0 | R[1] | | |
| 1 | | R[1] | |
| 2 | W[2] | | |
| 3 | | R[2] | |
| 4 | | | R[2] |
| 5 | R[2] | | |
| 6 | | R[2] | |
| 7 | | | R[2] |
| 8 | W[3] | | |
| 9 | R[3] | | |
| 10 | | | R[3] |

| 0 | P0; @; IC[0]; DATA [1] |
|---|---|
| 1 | P1; @; IC[1]; R->R; P0->P0, P1 |
| 2 | P0; @; IC[2]; R->W; P0, P1->P0 |
| 3 | P1; @; IC[3];W->R; P0->P0, P1 |
| 4 | P2; @; IC[4]; R->R; P0, P1->P0, P1, P2 |
| 5 | |
| 6 | |
| 7 | |
| 8 | P0; @; IC[8]; R->W; P0, P1, P2->P0 |
| 9 | |
| 10 | P2; @; IC[10]; R->R; P0->P0, P2 |

| 0 | P0; @; IC[0]; DATA [1] |
|---|---|
| 1 | P1; @; IC[1]; R->R; P0-> P1 |
| 2 | P0; @; IC[2]; R->W; P1->P0 |
| 3 | P1; @; IC[3];W->R; P0->P1 |
| 4 | P2; @; IC[4]; R->R; P1->P2 |
| 5 | P0; @; IC[5]; R->R; P2->P0 |
| 6 | P1; @; IC[6]; R->R; P0->P1 |
| 7 | P2; @; IC[7]; R->R; P1->P2 |
| 8 | P0; @; IC[8]; R->W; P2->P0 |
| 9 |  |
| 10 | P2; @; IC[10]; R->R; P0->P2 |

| ID | A0 | A1 | A2 | A3 | B0 | B1 | B2 | B3 |
|---|---|---|---|---|---|---|---|---|
| 0 | R[1] | | | | | | | |
| 1 | | | | | R[1] | | | |
| 2 | | R[1] | | | | | | |
| 3 | | | W[2] | | | | | |
| 4 | | | R[2] | | | | | |
| 5 | | | | | R[2] | | | |
| 6 | | | | | | R[2] | | |
| 7 | | | | | R[2] | | | |
| 8 | W[3] | | | | | | | |
| 9 | W[4] | | | | | | | |
| 10 | | R[4] | | | | | | |
| 11 | | | R[4] | | | | | |
| 12 | | | | | R[4] | | | |
| 13 | | | | | | R[4] | | |
| 14 | R[4] | | | | | | | |

| ID | P0 | P1 |
|---|---|---|
| 0 | W[1] | |
| 1 | | R[1] |
| 2 | R[1] | |
| 3 | | R[1] |
| 4 | W[2] | |
| 5 | | R[2] |

| ID | CCP Units + Flag | CCP Index + Flag |
|---|---|---|
| 0 | | |
| 1 | Log DATA | Log DATA |
| 2 | Log R->R | Log R->R |
| 3 | | Log R->R |
| 4 | Log R->W | Log R->W |
| 5 | Log W->R | Log W->R |

FIG. 9B

CACHE-BASED TRACE RECORDING USING CACHE COHERENCE PROTOCOL DATA

CROSS-REFERENCE TO RELATED APPLICATION

This application claims priority to, and the benefit of, U.S. Provisional Patent Application No. 62/559,780, filed Sep. 18, 2017, and titled "CACHE-BASED TRACE RECORDING USING CACHE COHERENCE PROTOCOL DATA", the entire contents of which are incorporated by reference herein in their entirety.

BACKGROUND

When writing code during the development of software applications, developers commonly spend a significant amount of time "debugging" the code to find runtime and other source code errors. In doing so, developers may take several approaches to reproduce and localize a source code bug, such as observing the behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, cause execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace files. These trace file(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

BRIEF SUMMARY

Embodiments herein enhance "time travel" debugging recordings, by utilizing a processor's shared cache, along with its cache coherence protocol (CCP), in order to determine what data should be logged to a trace file. Doing so can reduce trace file size by several orders of magnitude when compared to prior approaches, thereby significantly reducing the overhead of trace recording.

Some embodiments are implemented in computing environments that include (i) a plurality of processing units, and (ii) a cache memory comprising a plurality of cache lines that are used to cache data from one or more backing stores and that are shared by the plurality of processing units. Consistency between data in the plurality of cache lines and the one or more backing stores is managed according to a cache coherence protocol.

These embodiments include performing a cache-based trace recording using CCP data. These embodiments include determining that an operation has caused an interaction between a particular cache line of the plurality of cache lines and the one or more backing stores, that logging is enabled for a particular processing unit of the plurality of processing units that caused the operation, that the particular cache line is a participant in logging, and that the CCP indicates that there is data to be logged to a trace. Based at least on these determinations, embodiments cause this data to be logged to the trace. The data is usable to replay the operation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6C illustrates a table that shows example data stored in accounting bits (i.e., units bits, index bits, and/or flag bits) of a shared cache based on the read and write activity shown in FIG. 6A;

FIG. 7A illustrates an example in which some read->read transitions might be omitted from a trace depending on how processors are tracked;

FIG. 7B illustrates an example of logging data that omit the read->read transitions highlighted in FIG. 7A;

FIG. 7C illustrates a table that shows example logging data that might be recorded if "index bits" are used and indexes are updated on reads;

FIG. 8B illustrates a table that shows example read and write operations performed by some of the processing units of FIG. 8A;

FIG. 9A illustrates a table that shows example reads and writes by two processing units;

FIG. 9B illustrates an example of illustrates a table that compares when log entries could be made an environment that provides CCP unit information plus a cache line flag bit, versus an environment that provides CCP index information plus a cache line flag bit;

DETAILED DESCRIPTION

Embodiments herein enhance "time travel" debugging recordings, by utilizing a processor's shared cache, along with its cache coherence protocol, in order to determine what data should be logged to a trace file. Doing so can reduce trace file size by several orders of magnitude when compared to prior approaches, thereby significantly reducing the overhead of trace recording.

Figure 1:
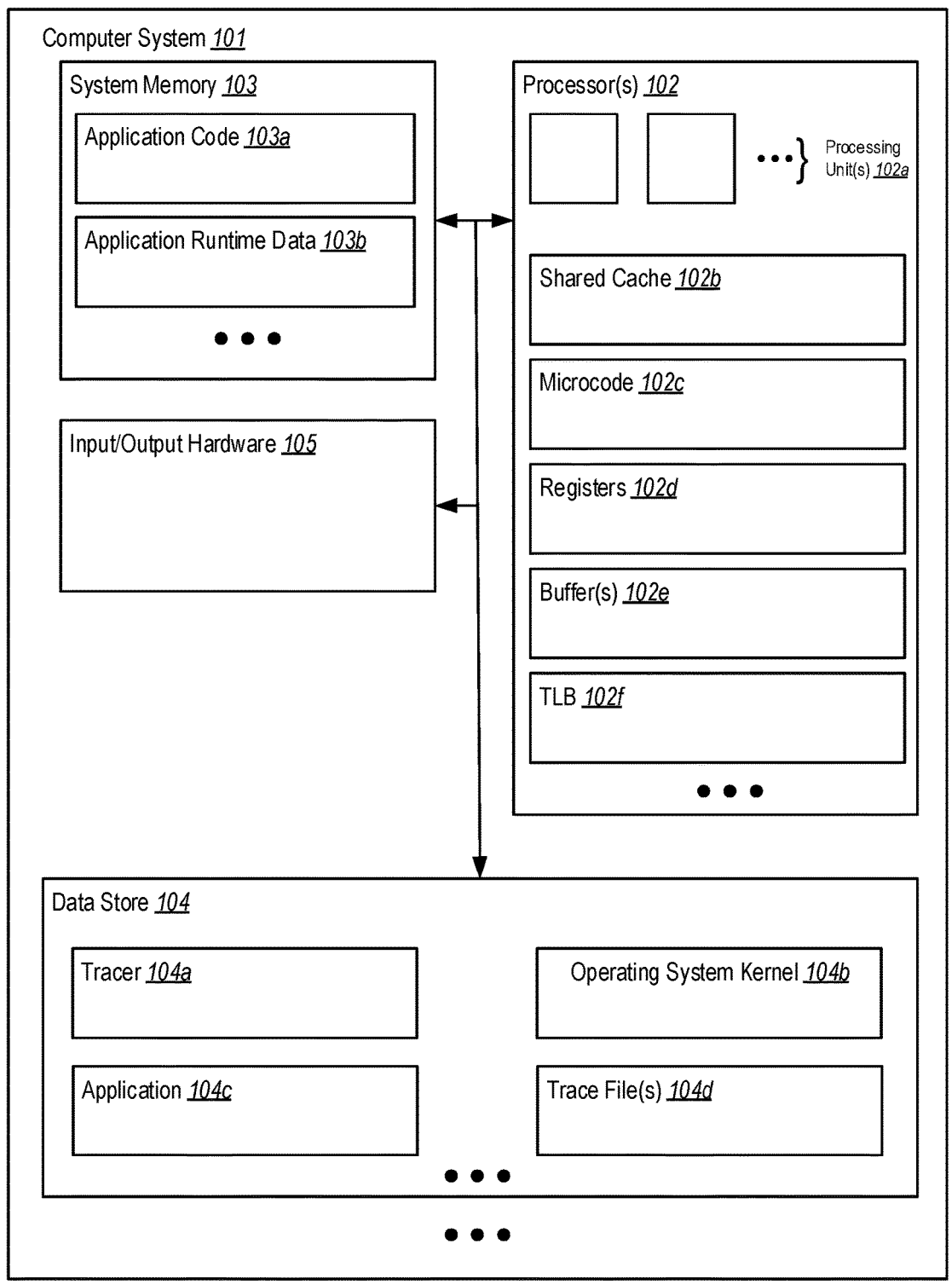
FIG. 1 illustrates an example computing environment that facilitates recording of "bit-accurate" traces of code execution via shared caches using cache coherence protocol (CCP) data.

FIG. 1 illustrates an example computing environment 100 that facilitates recording "bit-accurate" traces of code execution via shared caches using cache coherence protocol data. As depicted, embodiments may comprise or utilize a special-purpose or general-purpose computer system 101 that includes computer hardware, such as, for example, one or more processor(s) 102, system memory 103, one or more data stores 104, and/or input/output hardware 105.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise hardware (e.g., a network interface module (e.g., a "NIC")) that connects a network and/or data link which can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a NIC (e.g., input/output hardware 105), and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

As illustrated, the data store 104 can store computer-executable instructions and/or data structures representing application programs such as, for example, a tracer 104a, an operating system kernel 104b, and application 104c (e.g., the application that is the subject of tracing by the tracer 104a, and one or more trace file(s) 104d). When these programs are executing (e.g., using the processor(s) 102), the system memory 103 can store corresponding runtime data, such as runtime data structures, computer-executable instructions, etc. Thus, FIG. 1 illustrates the system memory 103 as including runtime application code 103a and application runtime data 103b (e.g., each corresponding with application 104c).

The tracer 104a is usable to record a bit-accurate trace of execution of an application, such as application 104c, and to store trace data in the trace file(s) 104d. In some embodiments, the tracer 104a is a standalone application, while in other embodiments the tracer 104a is integrated into another software component, such as the operating system kernel 104b, a hypervisor, a cloud fabric, etc. While the trace file(s) 104d are depicted as being stored in the data store 104, the trace file(s) 104d may also be recorded exclusively or temporarily in the system memory 103, or at some other storage device.

FIG. 1 includes a simplified representation of the internal hardware components of the processor(s) 102. As illustrated, each processor 102 includes a plurality of processing unit(s) 102a. Each processing unit may be physical (i.e., a physical processor core) and/or logical (i.e., a logical core presented by a physical core that supports hyper-threading, in which more than one application threads executes at the physical core). Thus, for example, even though the processor 102 may in some embodiments include only a single physical processing unit (core), it could include two or more logical processing units 102a presented by that single physical processing unit.

Each processing unit 102a executes processor instructions that are defined by applications (e.g., tracer 104a, operating kernel 104b, application 104c, etc.), and which instructions are selected from among a predefined processor instruction set architecture (ISA). The particular ISA of each processor 102 varies based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, an "instruction" is the smallest externally-visible (i.e., external to the processor) unit of code that is executable by a processor.

Each processing unit 102a obtains processor instructions from a shared cache 102b, and executes the processor instructions based on data in the shared cache 102b, based on data in registers 102d, and/or without input data. In general, the shared cache 102b is a small amount (i.e., small relative to the typical amount of system memory 103) of random-access memory that stores on-processor copies of portions of a backing store, such as the system memory 103 and/or another cache. For example, when executing the application code 103a, the shared cache 102b contains portions of the application runtime data 103b. If the processing unit(s) 102a require data not already stored in the shared cache 102b, then a "cache miss" occurs, and that data is fetched from the system memory 103 (potentially "evicting" some other data from the shared cache 102b).

Figure 2:
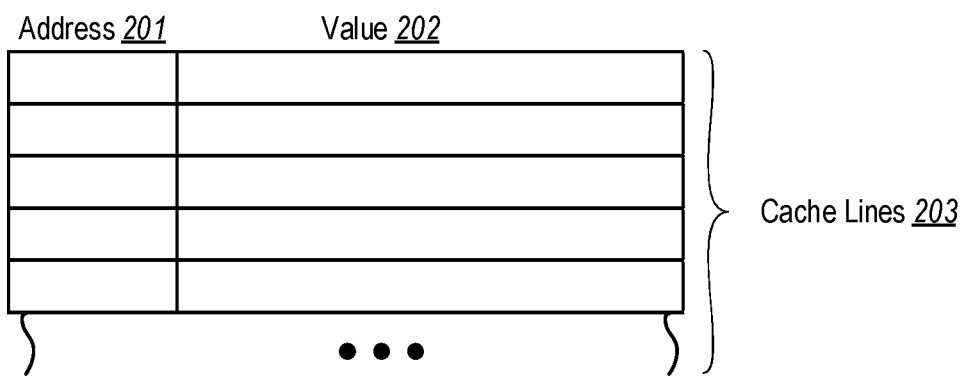
FIG. 2 illustrates an example of a shared cache.

Typically, a shared cache 102b comprises a plurality of "cache lines," each of which stores a chunk of memory from the backing store. For example, FIG. 2 illustrates an example of at least a portion of a shared cache 200, which includes a plurality of cache lines 203, each of which includes an address portion 201 and a value portion 202. The address portion 201 of each cache line 203 can store an address in the backing store (e.g., system memory 103) for which the line corresponds, and the value portion 202 can initially store a value received from the backing store. The value portion 202 can be modified by the processing units 102a, and eventually be evicted back to the backing store. As indicated by the ellipses, a shared cache 200 can include a large number of cache lines. For example, a contemporary INTEL processor may contain a layer-1 cache comprising 512 or more cache lines. In this cache, each cache line is typically usable to store a 64 byte (512 bit) value in reference to an 8 byte (64 bit) memory address.

The address stored in the address portion 201 of each cache line 203 may be a physical address, such as the actual memory address in the system memory 103. Alternatively, the address stored in the address portion 201 of each cache line 203 may be a virtual address, which is an address that is assigned to the physical address to provide an abstraction. Such abstractions can be used, for example, to facilitate memory isolation between different processes executing at the processor(s) 102. When virtual addresses are used, a processor 102 may include a translation lookaside buffer (TLB) 102f (usually part of a memory management unit (MMU)), which maintains mappings between physical and virtual memory address.

A shared cache 102b may include a code cache portion and a data cache portion. For example, when executing the application code 103a, the code portion of the shared cache 102b stores at least a portion of the processor instructions stored in the application code 103a and the data portion of the shared cache 102b stores at least a portion of data structures of the application runtime data 103b. Often times, a processor cache is divided into separate tiers/layers (e.g., layer 1 (L1), layer 2 (L2), and layer 3 (L3)), with some tiers (e.g., L3) potentially existing separate from the processor(s) 102. Thus, the shared cache 102b may comprise one of these layers (L1), or may comprise a plurality of these layers.

When multiple cache layers are used, the processing unit(s) 102a interact directly with the lowest layer (L1). In most cases, data flows between the layers (e.g., on a read an L3 cache interacts with the system memory 103 and serves data to an L2 cache, and the L2 cache in turn serves data to the L1 cache). When a processing unit 102a needs to perform a write, the caches coordinate to ensure that those caches that had affected data that was shared among the processing unit(s) 102a don't have it anymore. This coordination is performed using a cache coherence protocol (discussed later).

Caches can be inclusive, exclusive, or include both inclusive and exclusive behaviors. For example, in an inclusive cache an L3 layer would store a superset of the data in the L2 layers below it, and the L2 layers store a superset of the L1 layers below them. In exclusive caches, the layers may be disjointed—for example, if data exists in an L3 cache that an L1 cache needs, they may swap information, such as data, address, and the like.

Each processing unit 102 also includes microcode 102c, which comprises control logic (i.e., executable instructions) that control operation of the processor 102, and which generally functions as an interpreter between the hardware of the processor and the processor ISA exposed by the processor 102 to executing applications. The microcode 102 may be embodied on on-processor storage, such as ROM, EEPROM, etc.

Registers 102d are hardware-based storage locations that are defined based on the ISA of the processors(s) 102 and that are read from and/or written to by processor instructions. For example, registers 102d are commonly used to store values fetched from the shared cache 102b for use by instructions, to store the results of executing instructions, and/or to store status or state—such as some of the side-effects of executing instructions (e.g., the sign of a value changing, a value reaching zero, the occurrence of a carry, etc.), a processor cycle count, etc. Thus, some registers 102d may comprise "flags" that are used to signal some state change caused by executing processor instructions. In some embodiment, processors 102 may also include control registers, which are used to control different aspects of processor operation.

In some embodiments, the processor(s) 102 may include one or more buffer(s) 102e. As will be discussed herein after, buffer(s) 102e may be used as a temporary storage location for trace data. Thus, for example, the processors(s) 102 may store portions of trace data the buffer(s) 102e, and flush that data to the trace file(s) 104d at appropriate times, such as when there is available memory bus bandwidth. In some implementations, the buffer(s) 102e could be part of the shared cache 102b.

As alluded to above, processors possessing a shared cache 102b operate the cache according to a cache coherence protocol ("CCP"). In particular, CCPs define how consistency is maintained between data in the shared cache 102b and the backing data store (e.g., system memory 103 or another cache) as the various processing units 102a read from and write to data in the shared cache 102b, and how to ensure that the various processing units 102a always read valid data from a given location in the shared cache 102b. CCPs are typically related to and enable a memory model defined by the processor 102's ISA.

Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual locations (e.g., lines) in the shared cache 102b. A "modified" cache location contains data that has been modified in the shared cache 102b, and is therefore potentially inconsistent with the corresponding data in the backing store (e.g., system memory 103 or another cache). When a location having the "modified" state is evicted from the shared cache 102b, common CCPs require the cache to guarantee that its data is written back to the backing store, or that another cache take over this responsibility. A "shared" cache location contains data that is unmodified from the data in the backing store, exists in read-only state, and is shared by the processing unit(s) 102a. The shared cache 102b can evict this data without writing it to the backing store. An "invalid" cache location contains no valid data, and can be considered empty and usable to store data from cache miss. An "exclusive" cache location contains data that matches the backing store, and is used by only a single processing unit 102a. It may be changed to the "shared" state at any time (i.e., in response to a read request) or may be changed to the "modified" state when writing to it. An "owned" cache location is shared by two or more processing units 102a, but one of the processing units has the exclusive right to make changes to it. When that processing makes changes, it directly or indirectly notifies the other processing units—since the notified processing units may need to invalidate or update based on the CCP implementation.

The granularity with which different CCPs track cache coherence and make that cache coherence data available to the tracer 104a can vary. For example, at one end of the spectrum, some CCPs track cache coherence per cache line as well as per processing unit. These CCPs can, therefore, track the state of each cache line as it relates to each processing unit. As will be demonstrated in the example that follows in connection with FIGS. 6A-6D, this means that a single cache line can have information about its state as it relates to each processing unit 102a. Other CCPs are less granular, and track cache coherence the level of the cache line only (and lack per-processing unit information). At the other end of the spectrum, processor manufacturers may choose to track cache coherence the level of the cache line only for efficiency, since only one processor can own a line exclusively (exclusive, modified, etc.) at a time. As a mid-granularity example, a CCP may track cache coherence per cache line, as well as an index (e.g., 0, 1, 2, 3 for a four-processing unit processor) to the processing unit that has the current cache line state.

Embodiments utilize the processor's shared cache 102b to efficiently record a bit-accurate trace of execution of an application 104c and/or the operating system kernel 104b. These embodiments are built upon an observation that the processor 102 (including the shared cache 102b) form a semi- or quasi-closed system. For example, once portions of data for a process (i.e., code data and runtime application data) are loaded into the shared cache 102b, the processor 102 can run by itself—without any input—as a semi- or quasi-closed system for bursts of time. In particular, one or more of the processing units 102a execute instructions from the code portion of the shared cache 102b, using runtime data stored in the data portions of the shared cache 102b and using the registers 102d.

When a processing unit 102a needs some influx of information (e.g., because an instruction it is executing, will execute, or may execute accesses code or runtime data not already in the shared cache 102b), a "cache miss" occurs and that information is brought into the shared cache 102b from the system memory 103. For example, if a data cache miss occurs when an executed instruction performs a memory operation at a memory address within the application runtime data 103b, data from that memory address is brought into one of the cache lines of the data portion of the shared cache 102b. Similarly, if a code cache miss occurs when an instruction performs a memory operation at a memory address application code 103a stored in system memory 103, code from that memory address is brought into one of the cache lines of the code portion of the shared cache 102b. The processing unit 102a then continues execution using the new information in the shared cache 102b until new information is again brought into the shared cache 102b (e.g., due to another cache miss or an un-cached read).

The inventor has observed that, in order to record a bit-accurate representation of execution of an application, the tracer 104a can record sufficient data to be able to reproduce the influx of information into the shared cache 102b during execution of that application's thread(s). A first approach to doing this is to record all of the data brought into the shared cache 102b by logging all cache misses and un-cached reads (i.e., reads from hardware components and un-cacheable memory), along with a time during execution at which each piece of data was brought into the shared cache 102b (e.g., using a count of instructions executed or some other counter). This approach is described in Applicant's co-pending application U.S. Ser. No. 15/349,555, filed Nov. 11, 2016 and titled "CACHE-BASED TRACING FOR TIME TRAVEL DEBUGGING AND ANALYSIS", the entire contents of which are incorporated by reference herein in their entirety.

A second approach—which results in significantly smaller trace files than the first approach—is to track and record the cache lines that were "consumed" by each processing unit 102a. As used herein, a processing unit has "consumed" a cache line when it is aware of its present value. This could be because the processing unit is the one that wrote the present value of the cache line, or because the processing unit performed a read on the cache line. This second approach involves extensions to the shared cache 102b that enable the processor 102 to identify, for each cache line, one or more processing units 102a that consumed the cache line. This approach is described in Applicant's co-pending application U.S. Ser. No. 15/298,439, filed Oct. 20, 2016 and titled "FACILITATING RECORDING A TRACE FILE OF CODE EXECUTION USING A PROCESSOR CACHE" and U.S. Ser. No. 15/604,334, filed May 24, 2017 and titled "FACILITATING RECORDING A TRACE FILE OF CODE EXECUTION USING INDEX BITS IN A PROCESSOR CACHE", the entire contents of each of which are incorporated by reference herein in their entirety.

According to the embodiments herein, a third approach is to utilize the processor's CCP to determine a subset of "consumed" cache lines to record in the file(s) 104d, and which will still enable activity of the shared cache 102b to be reproduced. This third approach results in significantly smaller trace files—and thus significantly lower tracing overheads—than both of the first and second approaches.

Some embodiments herein record trace data streams that correspond to processing units/threads. For example, the trace file(s) 104 could include one or more separate trace data stream for each processing unit. In these embodiments, data packets in each trace data stream may lack identification of the processing unit the data packet applies to, since this information is inherent based on the trace data stream itself. In these embodiments, if the computer system 101 includes multiple processors 102 (i.e., within different processor sockets), the trace file(s) could have one or more different trace data streams for each processing unit 102a in the different processors 102. Plural data streams could even be used for a single thread. For example, some embodiments might associate one data stream with a processing unit used by a thread, and associate one or more additional data streams with each shared cache used by the thread.

In other embodiments, the trace file(s) 104 could include a single trace data stream for the processor 102, and could identify in each data packet which processing unit the data packet applies to. In these embodiments, if the computer system 101 includes multiple processors 102, the trace file(s) 104 could include a separate trace data stream for each of the multiple processors 102. Regardless of the layout of the trace file(s), data packets for each processing unit 102a are generally recorded independent of other processing units, enabling different threads that executed at the different processing units 102a to be replayed independently. The trace files can, however, include some information—whether it be express or inherent—that provides a partial ordering among the different threads.

Figure 3:
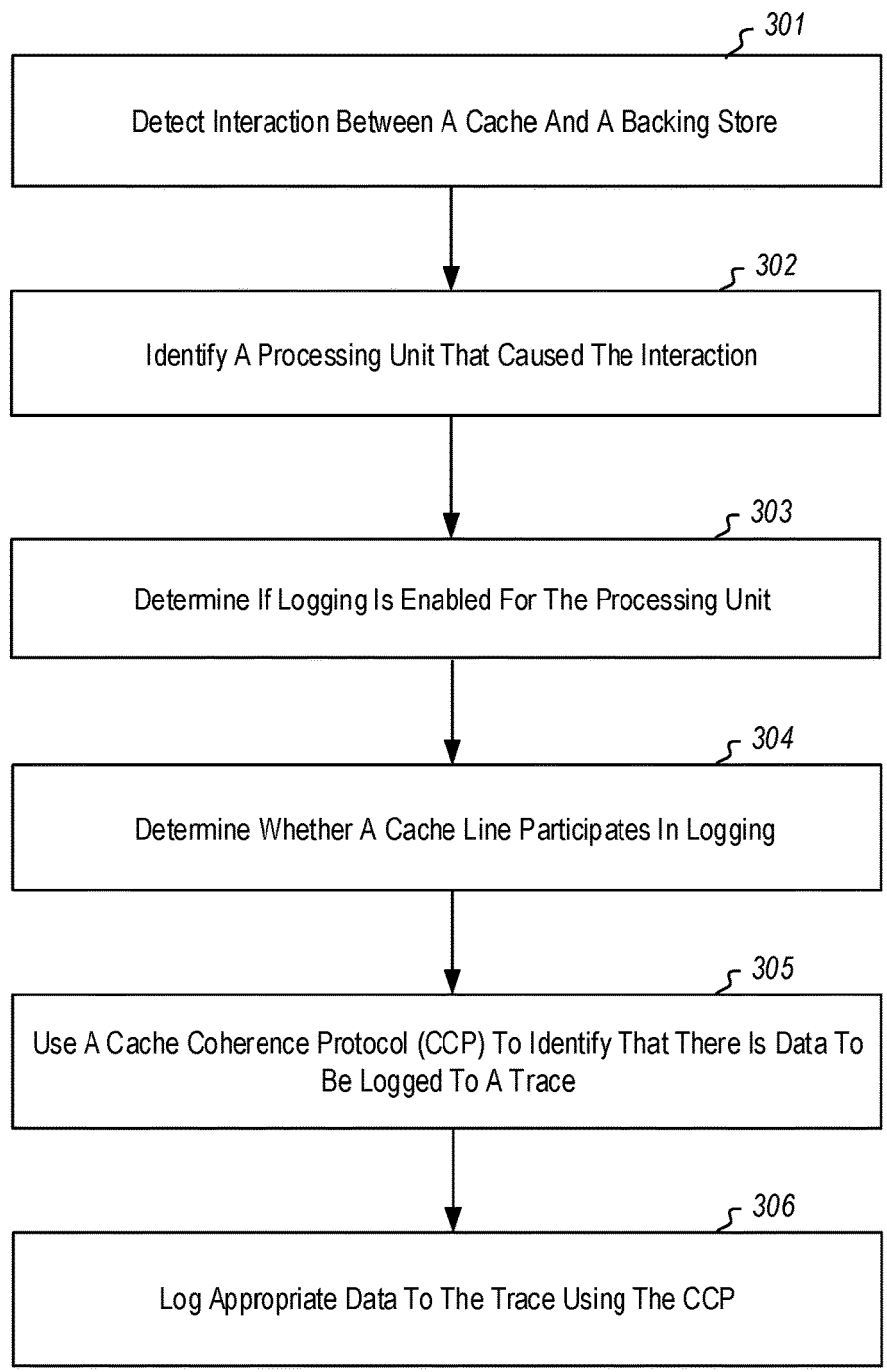
FIG. 3 illustrates a flowchart of an example method for performing a cache-based trace recording using CCP data.

FIG. 3 illustrates a flowchart of a method 300 for performing a cache-based trace recording using CCP data. Method 300 may include acts that are performed by the processor 102 as the tracer 104a traces the application 104c and/or the operating system kernel 104b. The actions made by the processor 102 may be based on hard-coded logic in the processor 102, soft-coded logic (i.e., microcode 102c), and/or another software application such as the tracer 104a, the operating system kernel 104b, or a hypervisor. While FIG. 3 illustrates a sequence of acts, it will be appreciated that embodiments could perform many of these acts in any order, with some even being performed parallel. As such, the sequence of acts shown in method 300 is non-limiting.

As depicted, method 300 includes an act 301 of detecting interaction between a cache and a backing store. In some embodiments, act 301 comprises detecting an operation that causes an interaction between a particular cache line of a plurality of cache lines and one or more backing stores. For example, while executing a thread of the application 104c or the operating system kernel 104b at one of the processing units 102a, the processing unit can cause an interaction between a line in the shared cache 102b and a backing store (e.g., system memory 103, or another cache). The detection can be performed, for example, by the processor 102 based on executing its microcode 102c.

Method 300 also includes an act 302 of identifying a processing unit that caused the interaction. In some embodiments, act 302 comprises identifying a particular processing unit of the plurality of processing units that caused the operation. For example, based on executing the microcode 102c, the processor 102 can identify which of the processing units 102a caused the operation detected in act 301.

Method 300 also includes an act 303 of determining if logging is enabled for the processing unit. In some embodiments, act 303 comprises using one or more logging control bits to determine that logging is enabled for the particular processing unit. For example, the processor 102 can determine whether the processing unit identified in act 302 has logging enabled, based on one or more logging control bits. Use of logging of logging control bit(s) enables logging of different processing units that can be dynamically enabled and disabled. Thus, by using logging control bit(s) the tracer 104a can dynamically control which thread(s) are being traced, and/or which portion(s) of execution of different threads is being traced.

The particular form and function of logging control bit(s) can vary. In some embodiments, for example, the logging control bit(s) is/are part of one of the registers 102d, such as a control register. In these embodiments, a single logging control bit could correspond to one processing unit 102a, or to a plurality of processing units 102a. Thus, a register 102d includes a single logging control bit (e.g., corresponding to all processing units or a specific processing unit or subset of processing units), or could potentially include a plurality of logging control bits (e.g., each corresponding to one or more processing units). In other embodiments, the logging control bit(s) comprise, or are otherwise associated with, an address space identifier (ASID) and/or a process-context identifier (PCID) corresponding to an instruction that caused the interaction between the cache and the backing store. Thus, for example, method 300 could trace a processing unit only when it is executing instructions associated with one or more particular ASIDs/PCIDs. In this way, method 300 can record only specified address space(s) and/or particular process context(s). Combinations are also possible. For example, the logging control bit(s) could be stored in one or more of registers 102d, but be set/cleared based on current ASID/PCID values. Regardless of the form of the logging control bit(s), some embodiments may be able to set/clear the logging control bit(s) at context switches, enabling method 300 to trace only particular threads.

Method 300 also includes an act 304 of determining whether a cache line participates in logging. In some embodiments, act 304 comprises, based at least on logging being enabled for the particular processing unit, determining whether the particular cache line is a participant in logging. For example, the processor 102 can determine whether the cache line involved in the operation detected in act 301 is involved in logging. As will be discussed in greater detail later, there are several mechanisms that can be used for the detection, such as use of bits within the shared cache 102b, or use of cache way-locking.

Method 300 also includes an act 305 using a CCP to identify that there is data to be logged to a trace. For example, the processor 102 can consult its CCP to determine what transitions in cache state occurred as a result of the operation, and if those transitions warrant logging data. Detailed examples of use of a CCP to identify trace data are given later in connection with FIGS. 6A-9B.

Method 300 also includes an act 306 of logging appropriate data to a trace using a CCP. In some embodiments, act 306 comprises causing the data to be logged to the trace, the data usable to replay the operation. When data is to be logged to the trace files(s) one or more data packets can be added to the appropriate trace data steams—such as a trace data stream that corresponds to the particular processing unit, or a trace data stream that corresponds to the processor 102 generally. If the appropriate trace data stream corresponds to the processor 102 generally, the one or more data packets may identify the particular processing unit. Note that if the trace data stream corresponds to the processor 102 generally, the inherent order of the data packets in the data stream itself provides some additional ordering information that may not be available if multiple data streams are used.

It is noted that when the shared cache 102b comprises multiple cache levels, in some embodiments method 300 operates at the cache level that interacts with system memory 103, since it is that cache level that processes the cache misses. Operating at this level enables cache activity of each processing unit 102a to be represented, without being redundant (i.e., representing a unit's activity more than once). Thus, for example, if the computer system 101 includes two processors 102 (i.e., two processor sockets) and comprises one "inclusive" L3 cache per socket, as well as "inclusive" L2 caches below the L3 cache, in some embodiments method 300 operates on the L3 caches. Method 300 can also operate at multiple cache levels. For example, if the computer system 101 includes one processor 102 (i.e., one processor socket) and comprises one "exclusive" L3 cache for the socket, as well as "inclusive" L2 caches below the L3 cache, it is the both the L3 and the L2 caches upon which method 300 might operate. Further examples of logging within caches exhibiting mixed inclusive/exclusive behaviors are discussed below.

As mentioned above in connection with act 304, there are several mechanisms that can be used by the processor 102 to determine whether a cache line is a "participant in logging." One is to extend each line of the shared cache 102b with one or more additional "accounting bits" that can be used as a flag, as processing unit identifiers, or as a processor index. Logic for controlling these "accounting bits" can be part of the processor's microcode 102c.

Figure 4A:
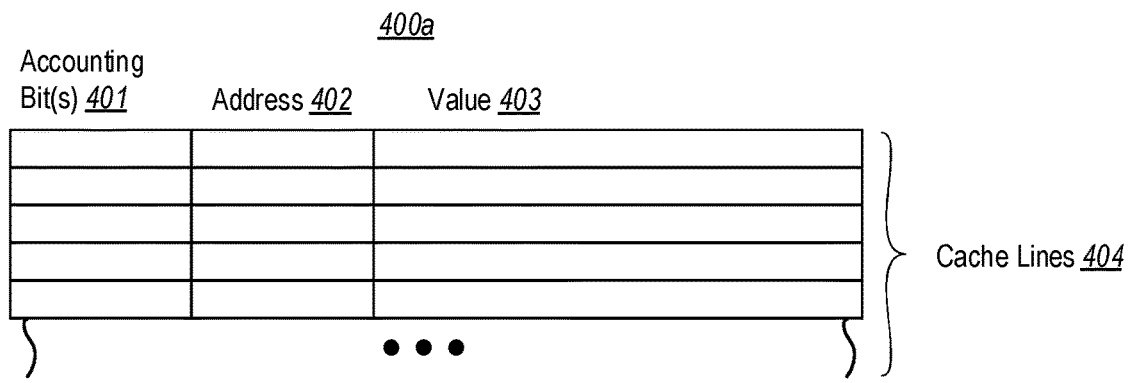
FIG. 4A illustrates an example shared cache that extends each of its cache lines with one or more additional accounting bits.

To illustrate this embodiment, FIG. 4A illustrates an example shared cache 400a, similar to the shared cache 200 of FIG. 2, that extends each of its cache lines 404 with one or more additional accounting bit(s) 401. Thus, each cache line 404 includes accounting bit(s) 401, conventional address bits 402, and value bits 403.

In some implementations, each cache line's accounting bit(s) 401 comprise a single bit that functions as a flag (i.e., on or off) used by the processor 102 to indicate whether or not the cache line is participating in trace logging. If the processor's CCP has sufficient granularity (e.g., if the CCP tracks coherence state for each cache line either as it relates to each processing unit, or in reference to an index to a processing unit that owns the cache line's coherence state), this single bit can be sufficient to facilitate recording a robust fully-deterministic trace (i.e., one that guarantees full reconstruct-ability of the traced execution).

In other implementations, each line's accounting bit(s) 401 includes a plurality of bits. Pluralities of bits could be used in several ways. Using one approach, referred to herein as "unit bits," each cache line's accounting bit(s) 401 can include a number of unit bits equal to a number of processing units 102a of the processor 102 (e.g., the number of logical processing units if the processor 102 supports hyper-threading or the number of physical processing units if hyper-threading is not supported). These unit bits can be used by the processor 102 to track which one or more particular processing unit(s) have consumed the cache line (or if the cache line has not been consumed, to note that none of the processing units have consumed it). Thus, for example, a shared cache 102b that is shared by two processing units 102a could include two unit bits for each cache line. In connection with these unit bits added to each cache line, embodiments extend the processor's microcode 102c to utilize these unit bits to track whether or not the current value in the cache line has been logged (i.e., in the trace file 104d) on behalf of each processing unit, or is otherwise known to the processing unit. If the processor's CCP has coarser granularity (e.g., if the CCP tracks coherence state at the level of the cache line only), these unit bits can provide additional information to facilitate a robust trace. For example, if a cache line is marked as shared or exclusive by the CCP, the unit bits can be used to identify which processing unit(s) share the cache line, or which processing unit has the exclusivity.

Using another approach, referred to herein as "index bits," each cache line's accounting bit(s) 401 can include a number of index bits sufficient to represent an index to each of the processing units 102a of the processor(s) 102 of computer system 101 that participate in logging, along with a "reserved" value (e.g., −1). For example, if the processor(s) 102 of computer system 101 includes 128 processing units 102a, these processing units can be identified by an index value (e.g., 0-127) using only seven index bits per cache line. In some embodiments, one index value is reserved (e.g., "invalid") to indicate that no processor has logged a cache line. Thus, this would mean that the seven index bits would actually be able to represent 127 processing units 102a, plus the reserved value. For example, binary values 0000000-1111110 might correspond to index locations 0-126 (decimal), and binary value 1111111 (e.g., −1 or 127 decimal, depending on interpretation) might correspond to "invalid," to indicate that no processor has logged the corresponding cache line—though this notation could vary, depending on implementation. Thus, unit bits can be used by the processor 102 to track if the cache line is participating in trace logging (e.g., a value other than −1), and as an index to a particular processing unit that consumed the cache line (e.g., the processing unit that most recently consumed it). This second approach has the advantage of supporting a great number of processing units with little overhead in the shared cache 102b, with the disadvantage of less granularity than the first approach (i.e., only one processing unit is identified at a time). Again, if the processor's CCP has coarser granularity (e.g., if the CCP tracks coherence state at the level of the cache line only), these index bits can provide additional information to facilitate a robust trace. For example, if a cache line is marked as shared or exclusive by the CCP, the index bits can be used to identify at least one processing unit that shares the cache line, or which processing unit has the exclusivity.

Figure 4B:
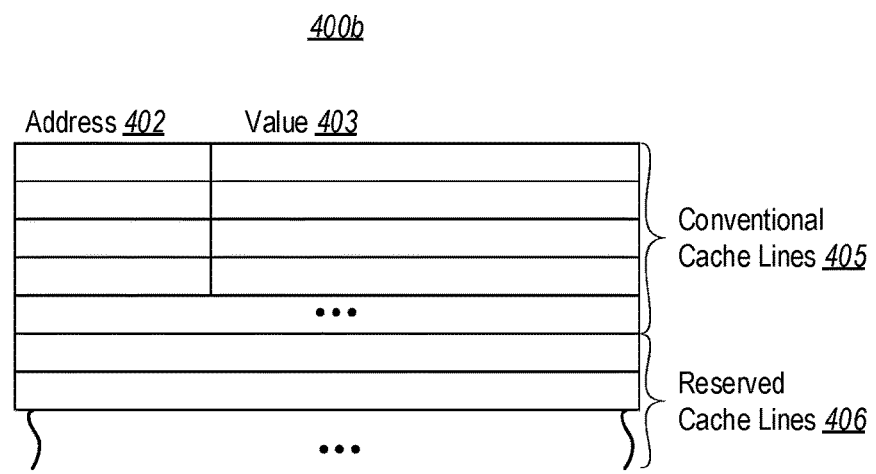
FIG. 4B illustrates an example of a shared cache that includes one or more reserved cache lines for storing accounting bits that apply to conventional cache lines.

Another mechanism that can be used by the processor 102 to determine whether a cache line is a participant in logging can employ the concepts discussed in connection with FIG. 4A, but without extending each cache line with additional accounting bit(s) 401. Instead, this mechanism reserves one or more of the cache lines 404 for storing accounting bits. FIG. 4B illustrates an example of a shared cache 400b that includes conventional cache lines 405 that store memory addresses 402 and values 403, as well as one or more reserved cache line(s) 406 for storing accounting bits that apply to the conventional cache lines 405. The bits of the reserved cache line(s) 406 are allocated into different groups of accounting bits that each corresponds to a different one of the conventional cache lines 405. These groups of accounting bits could function as a flag bit, unit bits, or index bits, depending on implementation.

Another mechanism that can be used by the processor(s) 102 to determine whether a cache line is a participant in logging is to utilize associative caches and way-locking. Since a processor's shared cache 102b is generally much smaller than system memory 103 (often by orders of magnitude), there are usually far more memory locations in the system memory 103 than there are lines in the shared cache 102b. As such, each processor defines a mechanism for mapping multiple memory locations of system memory to line(s) in a cache. Processors generally employ one of two general techniques: direct mapping and associative mapping. Using direct mapping, different memory locations in system memory 103 are mapped to just one line in the cache, such that each memory location can only be cached into a particular line in the cache.

Figure 5:
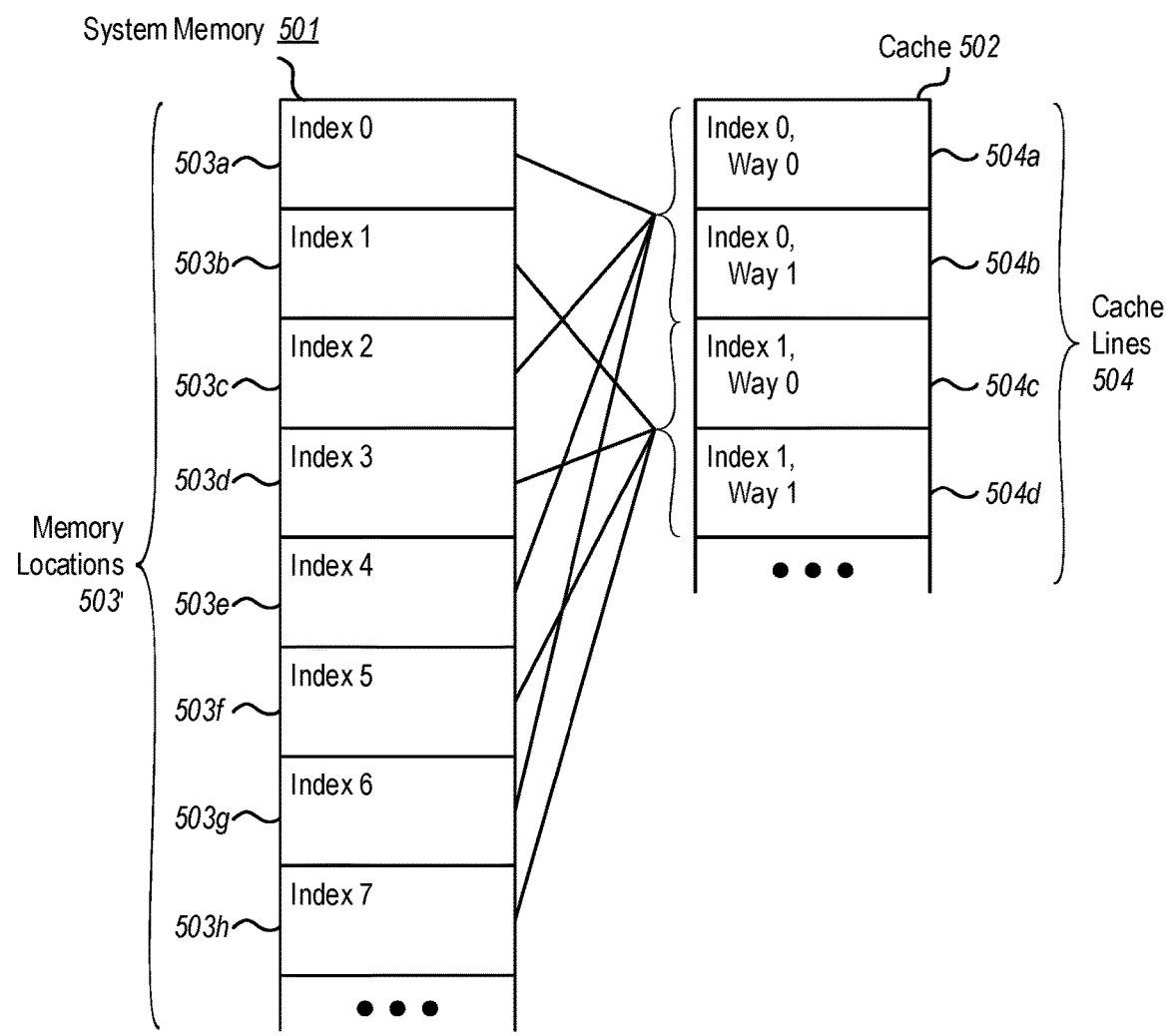
FIG. 5 illustrates an example of associative cache mappings.

Using associative mapping, on the other hand, different locations in system memory 103 can be cached to one of multiple lines in the shared cache 102b. FIG. 5 illustrates an example of associative cache mappings. Here, cache lines 504 of a cache 502 are logically partitioned into different address groups of two cache lines each, including a first group of two cache lines 504a and 504b (identified as index 0), and a second address group of two cache lines 504c and 504d (identified as index 1). Each cache line in an address group is associated with a different "way," such that cache line 504a is identified by index 0, way 0, cache line 504b is identified by index 0, way 1, and so on. As further depicted, memory locations 503a, 503c, 503e, and 503g (memory indexes 0, 2, 4, and 6) are mapped to index 0. As such, each of these locations in system memory can be cached to any cache line within the group at index 0 (i.e., cache lines 504a and 504b). The particular patterns of the depicted mappings are for illustrative and conceptual purposes only, and should not be interpreted as the only way in which memory indexes can be mapped to cache lines.

Associative caches are generally referred to as being N-way associative caches, where N is the number of "ways" in each address group. Thus, the cache 500 of FIG. 5 could be referred to as a 2-way associative cache. Processors commonly implement N-way caches where N is a power of two (e.g., 2, 4, 8, etc.), with N values of 4 and 8 being commonly chosen (though the embodiments herein are not limited to any particular N-values or subsets of N-values). Notably, a 1-way associative cache is generally equivalent to a direct-mapped cache, since each address group contains only one cache line. Additionally, if N equals the number of lines in the cache, it is referred to as a fully associative cache, since it comprises a single address group containing all lines in the cache. In fully associative caches any memory location can be cached to any line in the cache.

It is noted that FIG. 5 represents a simplified view of system memory and caches, in order to illustrate general principles. For example, while FIG. 5 maps individual memory locations to cache lines, it will be appreciated that each line in a cache generally stores data relating to multiple addressable locations in system memory. Thus, in FIG. 5, each location (503a-503h) in system memory (501) may actually represent a plurality of addressable memory locations. Additionally, mappings may be between actual physical addresses in the system memory 501 and lines in the cache 502, or may use an intermediary layer of virtual addresses.

Associative caches can be used for determining whether a cache line is a participant in logging through use of way-locking. Way-locking locks or reserves certain ways in a cache for some purpose. In particular, the embodiments herein utilize way-locking to reserve one or more ways for a thread that is being traced, such that the locked/reserved ways are used exclusively for storing cache misses relating to execution of that thread. Thus, referring back to FIG. 5, if "way 0" were locked for a traced thread, then cache lines 504a and 504c (i.e., index 0, way 0 and index 1, way 0) would be used exclusively for cache misses relating to execution of that thread, and the remaining cache lines would be used for all other cache misses. Thus, in order to determine whether a particular cache line is a participant in logging, the processor 102 need only determine whether the cache line is part of a way that is reserved for the thread that is being traced.

Figure 6A:
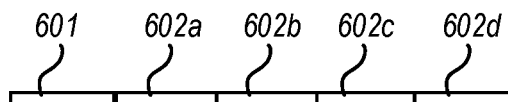
FIG. 6A illustrates a table that shows example read and write activity by four processing units on a single line in a shared cache.
Figure 6B:
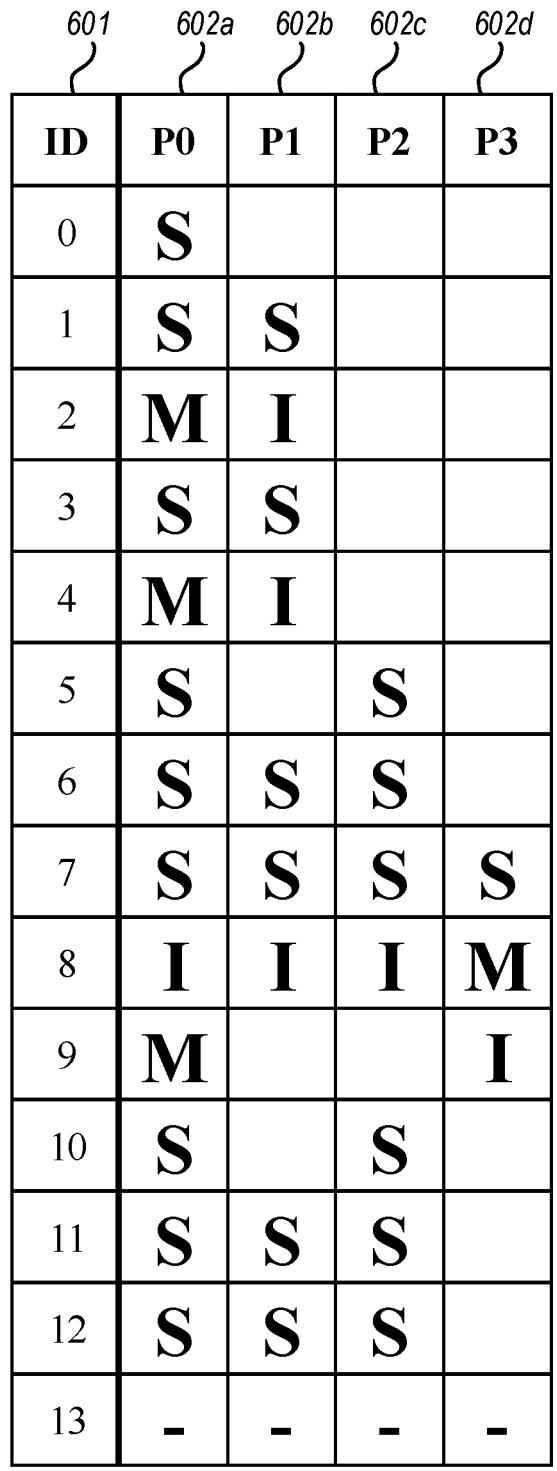
FIG. 6B illustrates a table that shows example tracked cache coherence state based on the read and write activity shown in FIG. 6A.
Figure 6D:
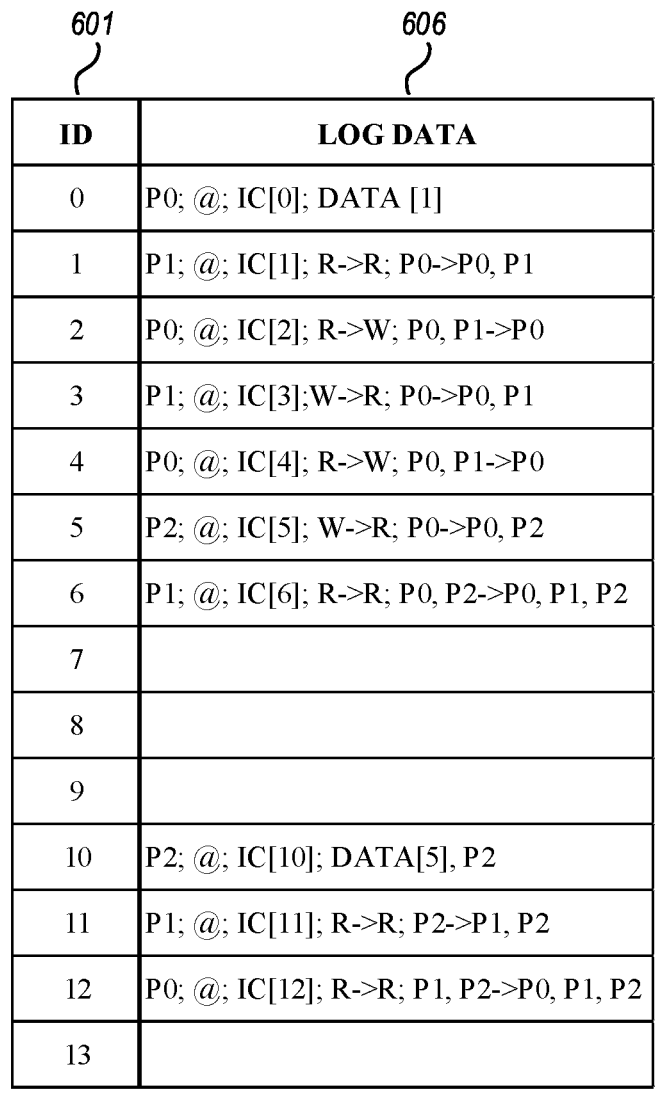
FIG. 6D illustrates a table that shows example log data that could be written to trace files in connection with the read and write activity shown in FIG. 6A.

FIGS. 6A-6D illustrates a concrete example of application of the method 300 of FIG. 3, in the context of FIGS. 1, 2, 4A, 4B, and 5. FIG. 6A illustrates a first table 600a that shows read and write activity by four processing units 102a (i.e., P0-P3) on a single line in the shared cache 102b. FIG. 6B illustrates a second table 600b that indicates one embodiment of tracked cache coherence state (e.g., as tracked using the processor's CCP) based on these reads and writes. FIG. 6C illustrates a third table 600c that shows what might be stored in accounting bits of the shared cache 102b (as described in connection with FIGS. 4A and 4B), if accounting bits are used at all. While only one type of accounting bits would typically be used (i.e., unit bits per line, index bits per line, or a flag bit per line), for completeness in description table 600c shows each of unit bits 603, index bits 604, and flag bit 605. Finally, FIG. 6D illustrates a fourth table 600d that shows example types of log data 606 that could potentially be written to the trace files(s) 104d in connection with each operation.

For simplicity in description, table 600a depicts operations by only a single processing unit 102a at a time, but it will be appreciated that the principles described herein apply to situations in which there is concurrent activity (e.g., concurrent reads by two or more processing units of the same cache line). Additionally, examples described in connection with FIGS. 6A-6D assume that tracking is enabled for processing units P0-P2, and is disabled for processing unit P3. For example, as discussed above, this could be controlled a bit corresponding to each processing unit, such a plurality of bits of a control register.

Initially, for ease in description, this example will use simplified cache lines states that are derived from the cache line states (i.e., Modified, Owned, Exclusive, Shared, and Invalid) used in the CCPs discussed above (i.e., MSI, MESI, and MOESI). In this simplification, these states map to either a "read" state (i.e., the cache line has been read from) or a "write" state (i.e., the cache line has been written to). Table 1 below shows one example of these mappings. Note that these mapping are used as an example only, and are non-limiting. For example, there could exist CCPs and states other than the ones discussed herein, and one of ordinary skill in the art will recognize, in view of the disclosure herein, that similar mappings can be made with many different CCPs.

TABLE 1

| Protocol State | Mapped State |
| --- | --- |
| Modified | Write |
| Owned | Read |
| Exclusive | Write |
| Shared | Read |
| Invalid | No mapping-cache line considered empty |

Notably, embodiments could log CCP data at varying levels, depending on what data is available from the processor 102 and/or based on implementation choices. For example, CCP data could be logged based on "mapped" CCP states (such the ones shown in Table 1), based on actual CCP states (e.g., Modified, Owned, Exclusive, Shared, and/or Invalid) made visible by the processor 102, and/or even based on lower-level "raw" CCP data that may not typically be made visible by the processor 102.

Turning to FIGS. 6A-6D, table 600a includes a first column 601 showing an identifier (ID), which is used to specify a global order among the operations. Table 600a also includes four additional columns 602a-602d that each corresponds to one of the processing units. While, for simplicity, this example uses a global ID, it will be appreciated that in practice each processing unit would normally order operations using its own independent sets of identifiers. These IDs could comprise an instruction count (IC), or any other appropriate mechanism for specifying an ordering among operations, such as a "jump count" plus program counter. Note that the example uses memory in a way that is consistent with the MSI, MESI, and MOESI CCPs, but for simplicity it uses only the "modified," "shared," and "invalid" states. It is noted, however, that some CCPs could provide their own unique and/or monotonically-incrementing IDs that could also be recorded in a trace (e.g., in every packet, or in occasional packets) to strongly order trace entries. Even if the CCP doesn't provide such an ID, the value of a socket timer (e.g., TSC) or another orderable ID could potentially be used.

As shown in table 600a, at identifier ID[0] processing unit P0 performs a read, which causes a cache miss bringing data DATA[1] into the cache line. Correspondingly, table 600b shows that the processor's CCP notes that the cache line is now "shared" by P0. Table 600c shows that if unit bits 603 are used they indicate that processing unit P0 has consumed (i.e., read) the cache line (and that processing units P1-P3 have not), that if index bits 604 are used they indicate that P0 has consumed the cache line, and that if a flag bit 605 is used it indicates that some processing unit has consumed the cache line. Given this status, in act 303 the processor 102 would determine that logging is enabled for P0, and in act 304 it would determine that the cache line participates in logging (i.e., using unit bits 603, index bits 604, flag bit 605, or way-locking). Thus, in act 306 the processor 102 would utilize the CCP to log appropriate data to the trace file(s), if necessary. Here, since the cache line is going from an invalid (empty) state to a read (table 600a)/shared (table 600b) state, data should be logged. As shown in the log data 606 of table 600d, the processor 102 could note the processing unit (P0) if necessary (i.e., depending on whether the data packets are being logged to separate data steams per processing unit, or to a single data stream); the cache line address (@); the instruction count or some other count; and the data (DATA [1]) that was brought into the cache line. While, as discussed above, the instruction count will typically be a processing unit-specific value, for simplicity table 600d refers to instruction counts in reference to the corresponding global ID (i.e., IC[0], in this instance).

It is noted that the cache line address (@) and the data (e.g., DATA[1]) could, in some embodiments, be compressed within the trace file(s) 104d. For example, memory addresses can be compressed by refraining from recording the "high" bits of a memory address by referencing (either expressly or implicitly) the "high" bits in a prior recorded memory address. Data can be compressed by grouping bits of a data value in to a plurality of groups comprising a plurality of bits each, and associating each group with a corresponding "flag" bit. If a group equals a particular pattern (e.g., all 0's, all 1's, etc.), the flag bit can be set, and that group of bits need not be stored in the trace. A further description of these techniques is described in Applicant's co-pending application U.S. Ser. No. 15/349,474, filed Nov. 11, 2016 and titled "REDUCING STORAGE REQUIREMENTS FOR STORING MEMORY ADDRESSES AND VALUES", the entire contents of which are incorporated by reference herein in their entirety.

Next, table 600a shows that at ID[1] processing unit P1 performs a read on the cache line, reading data DATA[1]. Table 600b shows that the processor's CCP notes that the cache line is now "shared" by P0 and P1. Table 600c shows that that processing units P0 and P1 have consumed the cache line (unit bits 603), that P1 has consumed the cache line (index bits 604), or that some processing unit has consumed the cache line (flag bit 605). Note that it would also be correct for the index bits 604 to still reference P0 instead of P1. Table 600d shows that, using the CCP, the processor 102 determines that a record of the operation is to be logged. As shown, the processor 102 could note the processing unit (P1); the cache line address (@); the instruction count (IC[1]); that the cache line has gone from a read (shared) state to a read (shared) state; and that P0 had prior access to prior cache line, but now P0 and P1 have access.

Next, table 600a shows that at ID[2] processing unit P0 performs a write to the cache line, writing data DATA[2]. Table 600b shows that the processor's CCP notes that the cache line is now "modified" by P0 and "invalid" for P1. Table 600c shows that only processing unit P0 has consumed (i.e., updated the value of) the cache line (unit bits 603), that P0 has consumed the cache line (index bits 604), or that some processing unit has consumed the cache line (flag bit 605). Table 600d shows that, using the CCP, the processor 102 determines that a record of the operation needs to be logged, since the cache line has been written/modified. As shown, the processor 102 could note the processing unit (P0); the cache line address (@); the instruction count (IC[2]); that the cache line has gone from a read (shared) state to a write (modified) state; and that P0 and P1 had prior access to prior cache line, but now only P0 has access.

Note that information about which processing unit(s) had prior access to a cache line could be found using the CCP state shown in table 600b. However, it is noted that some CCPs may not maintain sufficient information to do so (e.g., a CCP that tracks coherence state at cache line level only). Alternatively, if unit bits 603 are used, this information can be derived from the unit bits. Accordingly, the log data 606 shown in FIG. 6D assumes either a robust CCP that maintains this information, or use of unit bits 603.

If either of these are not used (e.g., if the CCP is not as robust, and if index bits 604, flag bit 605, or way-locking is used instead of unit bits 603), the log data 606 may be less thorough or larger. As a first example, if the CCP tracks coherence state at cache line level only, and if index bits 604 are used, the two can be used to identify that the cache line state is invalid (for all processing units), that it is modified (along with the index of the processing unit that has it modified), that it is exclusive (along with the index of the processing unit that has it exclusive), or that it is shared (and all processing units can have access). This can result in a simpler hardware implementation, with the disadvantage that when it is time to change the cache line from shared to modified or exclusive all processing units must be notified, rather than only the ones that would be known by a more granular CCP to share the cache line. As a second example, index bits 604 could be used to identify the last processing unit that accessed a cache line. Then, if the cache is inclusive (i.e., so many reads are hidden behind accesses at L2 or L1 cache levels) then even if processing units are reading the same cache line, an L3 cache may see relatively few repeated requests from the same processing units. Logging every index change for a read->read and then having the read->write, write->write, and write->read log the index as well gives the same data as the use of unit bits 603, at the cost of a potentially slightly larger trace. As a third example, each cache line could include a single flag bit, but the CCP could track coherence state for each cache line in reference to an index to a processing unit that owns the cache line's coherence state. Here, the trace may record more cache line movement than if unit bits were used or the CCP tracked individual processing units, but the trace can be still be fully deterministic. A brief comparison of trace file size when having information about each processing unit, versus only information about processor index, appears hereinafter in connection with FIGS. 9A and 9B.

Returning to FIG. 6A, table 600a shows that at ID[3] processing unit P1 performs a read from the cache line, reading data DATA[2]. Table 600b shows that the processor's CCP notes that the cache line is now "shared" by P0 and P1. Table 600c shows that processing units P0 and P1 have consumed the cache line (unit bits 603), that P1 has consumed the cache line (index bits 604), or that some processing unit has consumed the cache line (flag bit 605). Note that it would also be correct for the index bits 604 to still reference P0 instead of P1. Table 600d shows that, using the CCP, the processor 102 determines that a record of the operation needs to be logged, since the cache line has gone from a write (modified) state to a read (shared) state. As shown, the processor 102 could note the processing unit (P1); the cache line address (@); the instruction count (IC[3]); that the cache line has gone from a write (modified) state to a read (shared) state; and that P0 had prior access to prior cache line, but now P0 and P1 have access.

Next, table 600a shows that at ID[4] processing unit P0 again performs a write to the cache line, this time writing data DATA[3]. Table 600b shows that the processor's CCP notes that the cache line is again "modified" by P0 and "invalid" for P1. Table 600c shows that only processing unit P0 has consumed the cache line (unit bits 603), that P0 has consumed the cache line (index bits 604), or that some processing unit has consumed the cache line (flag bit 605). Table 600d shows that, using the CCP, the processor 102 determines that a record of the operation needs to be logged, since the cache line has been written/modified. As shown, the processor 102 could note the processing unit (P0); the cache line address (@); the instruction count (IC[4]); that the cache line has gone from read (shared) state to a write (modified) state; and that P0 and P1 had prior access to prior cache line, but now only P0 has access.

Next, table 600a shows that at ID[5] processing unit P2 performs a read from the cache line, reading data DATA[3]. Table 600b shows that the processor's CCP notes that the cache line is now "shared" by P0 and P2. Table 600c shows that processing units P0 and P2 have consumed the cache line (unit bits 603), that P2 has consumed the cache line (index bits 604), or that some processing unit has consumed the cache line (flag bit 605). Note that it would also be correct for the index bits 604 to still reference P0 instead of P2. Table 600d shows that, using the CCP, the processor 102 determines that a record of the operation needs to be logged, since the cache line has gone from a write (modified) state to a read (shared) state. As shown, the processor 102 could note the processing unit (P2); the cache line address (@); the instruction count (IC[5]); that the cache line has gone from a write (modified) state to a read (shared) state; and that P0 had prior access to prior cache line, but now P0 and P2 have access.

Next, table 600a shows that at ID[6] processing unit P1 performs a read from the cache line, also reading data DATA[3]. Table 600b shows that the processor's CCP notes that the cache line is now "shared" by P0, P1, and P2. Table 600c shows that processing units P0, P1, and P2 have consumed the cache line (unit bits 603), that P1 has consumed the cache line (index bits 604), or that some processing unit has consumed the cache line (flag bit 605). Note that it would also be correct for the index bits 604 to still reference P0 or P2 instead of P1. Table 600d shows that, using the CCP, the processor 102 determines that a record of the operation is to be logged. As shown, the processor 102 could note the processing unit (P1); the cache line address (@); the instruction count (IC[6]); that the cache line has gone from a read (shared) state to a read (shared) state; and that P0 and P2 had prior access to prior cache line, but now P0, P1, and P2 have access.

Next, table 600a shows that at ID[7] processing unit P3 performs a read from the cache line, also reading data DATA[3]. Table 600b shows that the processor's CCP notes that the cache line is now "shared" by P0, P1, P2 and P3. Table 600c shows that none of the unit bits 603, index bits 604, or flag bit 605 have been updated. This is because logging is disabled for P3, and, for purposes of tracing, it has thus not "consumed" the cache line by performing the read. Table 600d shows that no data has been logged. This is because in act 303 the processor 102 would determine that logging is not enabled for P3.

Next, table 600a shows that at ID[8] processing unit P3 performs a write at the cache line, writing data DATA[4]. Table 600b shows that the processor's CCP notes that the cache line is now "invalid" for P0, P1, and P2, and "modified" by P3. Table 600c shows that the unit bits 603, the index bits 604, and flag bit 605 all reflect the cache line as being not consumed by any processing unit. This is because logging is disabled for P3, so, for the purposes of tracing, it did not "consume" the cache line when it performed the write; furthermore, the write invalided the value in the cache line for the other processing units. Table 600d shows that no data has been logged. Again, this is because in act 303 the processor 102 would determine that logging is not enabled for P3.

Next, table 600a shows that at ID[9] processing unit P0 performs a write to the cache line, writing data DATA[5]. Table 600b shows that the processor's CCP notes that the cache line is now "modified" by P0 and "invalid" for P3. Table 600c shows that no processing unit has consumed the cache line. This is because no log entry was made in connection with this operation—as reflected in table 600d. No log entry need be made because the data written would be reproduced through normal execution of the instructions of P0's thread. However, an entry could optionally be written to the trace in this circumstance (i.e., a write to a cache line that is not logged by a processing unit with logging enabled) to provide extra data to a consumer of the trace. In this circumstance, a log entry might be treated as a read of the cache line value, plus the write of DATA[5].

Next, table 600a shows that at ID[10] processing unit P2 performs a read from the cache line, reading data DATA[5]. Table 600b shows that the processor's CCP notes that the cache line is now "shared" by P0 and P2. Table 600c shows that processing unit P2 has consumed the cache line (unit bits 603), that P2 has consumed the cache line (index bits 604), or that some processing unit has consumed the cache line (flag bit 605). Table 600d shows that, using the CCP, the processor 102 determines that a record of the operation needs to be logged, since the value cache line has not been previously logged (i.e., it was not logged at ID[9]). As shown, the processor 102 could note the processing unit (P2); the cache line address (@); the instruction count (IC[10]); that the data (DATA[5]) that was brought into the cache line; and that P2 has access to the cache line. It may be possible to also log that P0 also has access to the cache line, depending on what information the particular CCP and the accounting bits provide.

Next, table 600a shows that at ID[11] processing unit P1 performs a read from the cache line, also reading data DATA[5]. Table 600b shows that the processor's CCP notes that the cache line is now "shared" by P0, P1, and P2. Table 600c shows that processing units P1 and P2 have consumed the cache line (unit bits 603), that P1 has consumed the cache line (index bits 604), or that some processing unit has consumed the cache line (flag bit 605). Note that it would also be correct for the index bits 604 to still reference P2 instead of P1. Table 600d shows that, using the CCP, the processor 102 determines that a record of the operation is to be logged. As shown, the processor 102 could note the processing unit (P1); the cache line address (@); the instruction count (IC[11]); that the cache line has gone from a read (shared) state to a read (shared) state; and that P2 had prior access to prior cache line, but now P1 and P2 have access. Note that the value (DATA[5]) need not be logged, since it was logged by P2 at ID[10].

Next, table 600a shows that at ID[12] processing unit P0 performs a read from the cache line, also reading data DATA[5]. Table 600b shows that the processor's CCP still notes that the cache line is now "shared" by P0, P1, and P2. Table 600c shows that processing units P0, P1 and P2 have consumed the cache line (unit bits 603), that P0 has consumed the cache line (index bits 604), or that some processing unit has consumed the cache line (flag bit 605). Note that it would also be correct for the index bits 604 to still reference P1 or P2 instead of P0. Table 600d shows that, using the CCP, the processor 102 could determine that a record of the operation is to be logged. In this case, the processor 102 could note the processing unit (P0); the cache line address (@); the instruction count (IC[12]); that the cache line has gone from a read (shared) state to a read (shared) state; and that P1 and P2 had prior access to the prior cache line, but now P0, P1 and P2 have access. No value (DATA[5]) is logged, since it is available from P2.

Alternatively, it could be possible for the processor 102 to reference P0 only at ID[12], since P0 already has the value of the cache line (i.e., because it wrote that value at ID[9]). It could even be possible to refrain from any logging at ID[12], since heuristics could be used at replay to recover the value (i.e., DATA[5]) without information referencing P0 being in the trace. However, those techniques can be computationally expensive and reduce the ability of the system to detect when replay has "derailed." An example heuristic is to recognize that memory access across processing units are generally strongly ordered (based on the CCP data), so replay could use the last value across these units for a given memory location.

Next, table 600a shows that at ID[13] the cache line is evicted. As a result, table 600b shows that the CCP entries are empty, table 600c shows that the accounting bits reflect no processing unit as having consumed the cache line, and table 600d shows that no data is logged.

Note that while, for completeness, the log data 606 lists all of the ending access states (i.e. which processing units now have access to the cache line), this information is potentially implicit and trace file size may be reduced by omitting it. For example, on a transition from a write->read, the list of processing units having access after the read is always the processing unit that had access prior, plus the processing unit that performed the read. On a transition from a read->write or a transition from a write->write, the list of processing units having write access after the write is always the processing unit that performed the write. On a transition from a read->read, the list of processing units having access after the read is always the processing units having access before the transition, plus the processing unit that performed the read.

In general, in order to generate fully deterministic trace files, a CCP would dictate that all transitions (i.e. write->read, write->write, read->write, and read->read) across processing units (e.g., from P0 to P1) be logged. However, transitions within the same processing unit (e.g., from P0 to P0) need not be logged. These need not be logged because they will be reproduced through normal execution of the thread that executed at that processing unit.

It will be appreciated that, using data such as that which is logged in the example above, and with further knowledge of the CCP used by the processor 102 at which the recording was made, a full ordering of the operations that occurred at each thread can be reconstructed, and at least a partial ordering of the operations among the different processing units can be reconstructed. Thus, either through an indexing processes and/or through a replay of the trace file, each of the operations above can be reconstructed—even though they have not all been expressly recorded in the trace file(s) 104*d*.

In some embodiments, the tracer 104*a* may record additional data packets in the trace file(s) 104*d* in order to enhance logging of the ordering of operations across processing units. For example, the tracer 104*a* could record with some events ordering information such as monotonically incrementing numbers (MINs) (or some other counter/timer) in order to provide a full ordering of the events that have a MIN (or other counter/timer) across the threads. These MINs could be used to identify data packets corresponding to events that are defined to be "orderable" across threads. These events could be defined based on a "trace memory model" that defines how threads can interact through shared memory, and their shared use of data in the memory. As another example, the tracer 104*a* could (periodically or at random) record a hash of processor state based on a defined deterministic algorithm and a defined set of registers (e.g., program counter, stack, general purpose registers, etc.) As yet another example, the tracer 104*a* could (periodically or at random) forcefully log cache line data. As yet another example, the tracer 104*a* could include in the trace "transition" packets that log a hash all or a portion (e.g., a few bits) of data they implicitly carry. Thus, when this implicit data is reconstructed at replay, appropriate portions(s) of the implicit data can be hashed and matched to these transition packets to help identify its ordering. This may be useful, for example, if the CCP cannot track processor indexes associated with cache lines if the cache lines are in the shared state.

When the tracer 104*a* records additional data packets in the trace file(s) 104*d* in order to enhance the ordering, it may be possible to omit recording some of the transitions across processing units. For example, it may be possible to omit recording some read->read transitions across threads. This might result in a "weakened" non-deterministic trace in some situations—since the ordering of some reads may not be able to be fully reconstructed based on the trace and the CCP—but additional ordering information (e.g., MINs, hashes of processor state, extra cache line data) can help reduce the search space during replay to find valid orderings of the reads that do not "derail" replay of the trace. Benefits of omitting some of the read->read transitions across threads include trace size and potentially simplified modifications to the processor 101 to facilitate tracing.

FIG. 7A illustrates an example in which some read->read transitions might be omitted from the trace depending on how processors are tracked. Similar to FIG. 6A, FIG. 7A includes a table 700*a* with a global ID 701, and three columns (702*a*-702*c*) corresponding to three processing units (P0-P2). Omitting some read->read transitions is built upon two observations. First, writes need to be ordered; however all of the reads between two consecutive writes (e.g., the reads at ID[3]-ID[7]) will read the same value so the order among those reads is irrelevant (and thus a trace omitting those read->read transitions can be deterministic) Second, having a read "cross" a write when replaying (i.e., a read and a write to the same cache line being replayed in the incorrect order) means the correct data is not being used for replay; however, having data (e.g., MINs, etc.) to avoid making this mistake will help identify valid orderings.

In the example shown in table 700*a*, processing unit P2 only performs reads to shared data, and those shared reads only "steal" from other reads (e.g., assuming ID[9] has left the cache line shared). If no log entries are made for any of the read->read transitions (i.e., ID[4]-ID[7] and ID[10]), there would be no information in the trace to properly place P2's reads. Based on the writes it could be concluded that P2 never read the value DATA[1] (i.e., since the write at ID[2] didn't steal from P2), and lacking log entries for P2's read->read transitions (i.e., ID[4], ID[7], and ID[10]), all that can be concluded for P2 is that there was at least one read by P2 between ID[2] and ID[8]. If, however, there were log entries for ID[4] and ID[10], the remaining reads that may not need to be logged (i.e., ID[5]-ID[7], as shown in FIG. 7B) can be located. Each of these reads belongs to the same inter-write section as the last logged read (i.e., at ID[4]). These reads can therefore be located based on what the writes steal from (and if no operation steals from a read then there is no write after it until the next logged packet).

In view of table 700*a*, FIG. 7B illustrates a table 700*b* that shows logging data—omitting the read->read transitions highlighted in FIG. 7A, that might be recorded if "unit bits" are used. FIG. 7C illustrates a table 700*c* that shows logging data that might be recorded if "index bits" are used and the indexes are updated on reads.

Figure 8A:
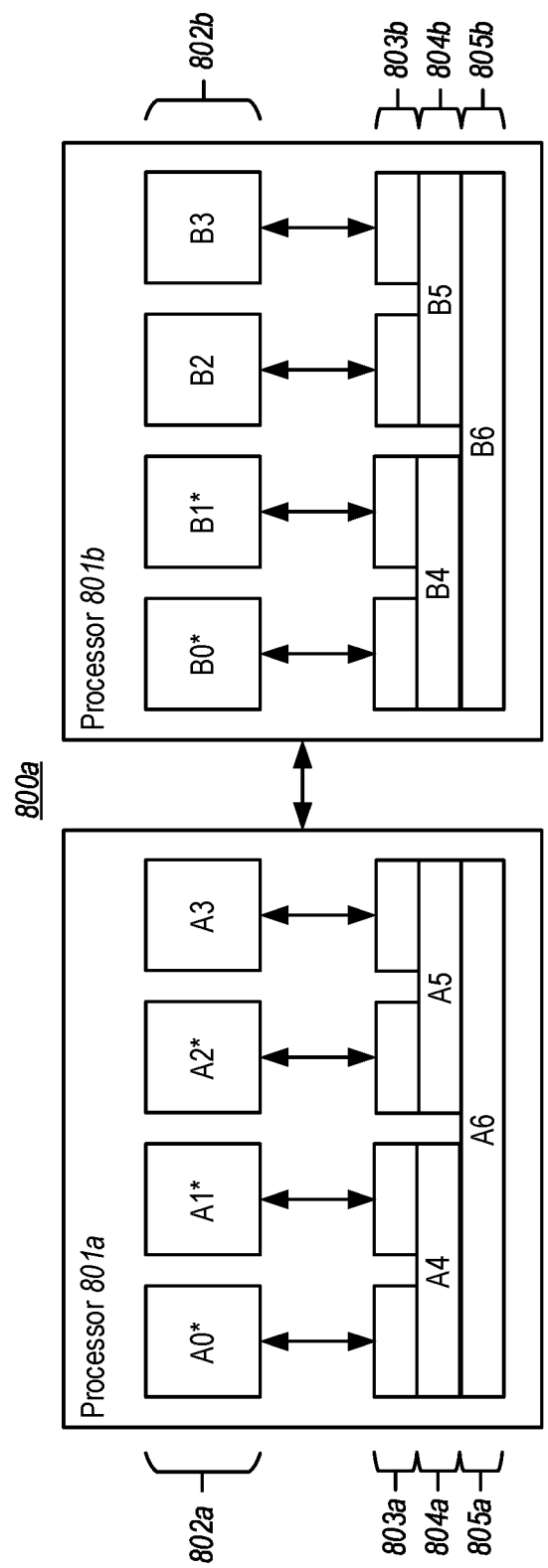
FIG. 8A illustrates an example computing environment including two processors, each including four processing units, and L1-L3 caches.

As mentioned briefly above, some caches include both inclusive and exclusive layers (i.e., a non-fully-inclusive cache). The logging techniques described herein are applicable to these caches, as well as purely inclusive or exclusive caches. As an example, FIG. 8A illustrates a computing environment 800*a* that includes two processors 801*a*/801*b* (e.g., two processors in corresponding sockets). Each processor 801 includes four processing units 802*a*/802*b* (e.g., physical or logical processing units). Each processor 801 also includes a three-layer cache, including an L1 layer 803*a*/803*b*, an L2 layer 804*a*/804*b*, and an L3 layer 805*a*/805*b*. As shown, each cache includes four L1 caches 803—each corresponding to one of the processing units 802. In addition, each cache includes two L2 caches 804—each corresponding to two of the processing units 802. In addition, each cache includes one L3 cache 805 for all of the processing units 802 in the processor 801. The processing units and some of the caches are individually identified—for example the processing units 802*a* processor 801*a* are identified as A0-A3, the L2 caches are identified as A4 and A5, and the L3 cache is identified as A6. Similar identifiers are used for corresponding components in processor 801*b*. The asterisks (*) associated with processing units A0, A1, A2, B0, and B1 indicate that logging is enabled for these processing units.

In computing environment 800*a*, the caches could exhibit a mix of inclusive and exclusive behaviors. For example, it may be inefficient for the A6 L3 cache of processor 801*a* to store a cache line when only processing unit A0 is using it. Instead, in this case the cache line could be stored in A0's L1 cache and the A4 L2 cache, but not on A1's L1 cache or the A5 L2 cache or lower caches. To free up space, some caches may allow the A6 L3 cache to evict that cache line in this situation. When this happens, A1 could obtain the cache line from the A4 L2 cache as would be normal in an inclusive cache. However, since the cache line does not exist in the A6 L3 cache or the A5 L2 cache, some cache implementations may also allow lateral movement of the cache line, such as from A0's L1 cache to A2 or A3's L1 caches. This can present some challenges to tracing using CCP's. The examples below illustrate how tracing using CCP's can be accomplished in such situations.

FIG. 8B illustrates includes a table 800b that shows example read and write operations performed by some of the processing units 802. The format of table 800b is similar to the format of table 600a. In view of the computing environment 800a and the table 800b, three different logging examples are now given, each using different cache behaviors. These examples are described in the context of the following principles for logging using a CCP:

(1) Generally, log data when an address (cache line) goes from "not logged" to "logged" (i.e., based on determining that the cache line participates in logging in act 304);

(2) Generally, refrain from logging when a cache line goes from "logged" to "not-logged" or "evicted" (though the log would still be valid if this data is logged). However, it is valid to log evictions. Doing so increases trace size, but provides additional information that can help to identify ordering among trace data streams, can help identify when replay of a trace has "derailed," and can provide for additional trace analysis. With respect to trace analysis, logging evictions can provide more information about how the cache was used, can be used to identify performance characteristics of the executed code, and can help pinpoint a time window during which a given cache line stored a particular value. Embodiments for logging evictions are discussed later in connection with FIGS. 10A and 10B;

(3) Log movement when the cache line moves across cores or cache coherency status in a way that provides new information;

(4) When a processing unit does a write, invalidate the cache line for all the other processing units. If the cache line hasn't been logged for the processing unit already, the system can either not log the cache line, or treat the write as: (i) a read (i.e., that logs the cache line and turns the logging tracking on), together with (ii) a write, assuming that the memory in the cache line is readable to the processing unit. It may be legal, but less efficient, for the processor to turn logging off and not log the write—but this loses information that needs to be reconstructed at replay and, on average, it may be trace size inefficient since it is cheaper to log a reference than to log a full cache line of data later;

(5) It is valid to over-log (e.g., as in principle 2 above) to help with reconstructing the trace later. Although this grows the trace size, it doesn't impact correctness. For example, some read->read transitions might be omitted (as described above in connection with FIGS. 7A-7C), but any cross-core transition that starts or ends with a write should be explicitly or implicitly logged. In another example, embodiments may add additional data packets (e.g., that provide additional ordering information and/or hashes) to the trace at any time. In yet another example, embodiments may log when a write is first committed to a cache line after its CCP transition to a write state (i.e., since speculative execution may cause a cache line to transition to a write state, but not actually commit any write to it). Logging these writes can facilitate the separation of per-core trace streams later. In yet another example, embodiments may log indirect jumps, or other information that helps quickly reduce the search space when separating trace data streams; and (6) A non-full log (i.e., one without all of the transitions logged) can still be used to replay the trace. This can bring about extra computational cost at replay time to calculate the missing pieces.

In a first example, the CCP tracks cache line status per processing unit (i.e., each core has its own read and write status). In this example, the cache behaves much like an inclusive cache, except that there may be data that moves cross-cache or cross-socket that is not available at logging time. For brevity, in these examples the processing units 802 are referred to as "cores" and processors 801a and 801b are referred to a processors A and B or sockets A and B. Additionally, a simplified logging notation of "ID:Core: From:Transition (i.e., from->to)" is used to represent types of data that could be logged. This notation is explained in more detail inline. For the first example, logging could include:

At ID[0], "0:A0:R[DATA]->[1]"—i.e., at ID[0], logging that core A0 read DATA[1], per principle 1 above.

At ID[1], "1:B0:R[DATA]->[1]"—i.e., at ID[1], logging that core B0 read DATA[1], also per principle 1 above. If the cache in processor B is unaware that A0 has the data already logged, then processor B logs it itself. Alternatively, if the cache in processor B is aware that A0 has DATA[1] logged, then the log entry could include "1:B0:R[A0]->R".

At ID[2], "2:A1:R[A0]->R"—i.e., at ID[2], logging that core A1 did a read->read transition, and that A0 had access. Since the cache line state is shared with processor B, the entry could be "2:A1:R:[A0,B0]->R"—i.e., at ID[2], logging that A1 did a read->read transition, and that A0 and B0 had access. Since crossing sockets is typically more expensive than logging within a socket, the first log entry may be preferred for read->read transitions. When logging to/from writes that cross sockets, however, logging also crosses sockets.

At ID[3], some embodiments log nothing. Alternatively, since the A2 core hasn't logged anything yet, and the first thing it does is a write, this could be logged as read->write. Either way, since a write occurred, the other cores have their cache line state invalidated. The cost (e.g., in terms of trace data) of logging the read->write at ID[3] would typically be less than logging actual data at ID[4], so it may be beneficial to log here. In this case, the log entry could include "3:A2: R[A0,B1,B0]->W"—i.e., core A2 did a read->write transition and cores A0, B1, and B0 had access.

What happens at ID[4] depends on what was logged at ID[3]. If nothing was logged in ID[3], then the data is logged (i.e., "4:A2:R[DATA]->[2]"). On the other hand, if a packet was logged in ID[3], then there is nothing to log.

At ID[5] there is a read that crosses cores. However, if the A2 core still has the cache line as modified (or equivalent) then the cache line serves the request (it can't be served from memory). In that case, socket B will know this came from socket A and re-logging the data can be avoided; it could be logged as "5:B0:W[A2]->R". If the cache got the data from main memory (this might be the case if socket A was able to update main memory and share its cache coherency state for the line) then the entry could be "5:B0:R[DATA]->2".

At ID[6] the operation is a normal read. Like the read at ID[2], socket B might know about socket A's data or not. If it does, the log entry could include "6:B1:R[B0,A2]->R"; otherwise it could include "6:B1:R[B0]->R".

At ID[7], if the cache line for B0 hasn't been evicted there is nothing to log. If it has been evicted, processor B would log the data as coming from another core, or log the cache line data. This evicting of one core, but not others in the socket, generally does not happen in fully inclusive caches. In a fully inclusive cache, if any core in the socket has the cache line in its L1 cache, then the L3 has the cache line, so that cache line cannot be evicted for one core but not another.

At ID[8], since the A0 core has nothing logged since and the first operation to log is a write, this is similar to the operation at ID[3]. Processor A can log this as a read->write; alternately, but perhaps less preferably, processor A could log nothing. If the packet is logged, its content would vary depending on whether socket A can see socket B. If it cannot, the packet could include "8:A0:R[A2]->W", but if it can the packet could include "8:A0:R[B0,B1,A2]->W".

At ID[9] there is nothing to log if a packet was logged at ID[8] (since it's a write on an already logged cache), though the cache line state for the other cores is typically invalidated if it wasn't already.

At ID [10], the logging depends on what was logged at ID[8]. If no data was logged at ID[8] then it needs to be done here, so the packet could include "10:A1:R[DATA]->[4]". If a packet was logged at ID[8], this is a normal write->read packet (e.g., "10:A1:W[A0]->R").

At ID[11] the read->read transition is logged. If a packet was logged at ID[8] then A0 is on the source list of cores (e.g., "11:A2:R[A0,A1]->R); otherwise, A0 is not in the list (e.g., "11:A2:R[A1]->R").

At ID[12] if socket B can see socket A, this is read->read packet (e.g., "12:B0:R[A0,A1,A2]->R"). If it can't then it is a full data log (e.g., "12:B0:R[DATA]->[4]").

At ID[13] the data comes from B0, plus socket A if it is visible (e.g., "13:B1:R[A0,A1,A2,B0]->R"). The list may omit core A0 if the write was not logged at ID[8].

At ID[14] nothing needs to be logged if a packet was logged at ID[8]. Otherwise A0 will get the data from A1 & A2, plus potentially the socket B if it can be seen. As such, the packet could include "14:A0:R[A1,A2,B0,B1]->R".

Note that while this example logged the sockets together, it would be correct to log each socket in isolation, similar to the way threads can be logged in isolation. This might result in larger traces, but it has the advantage of not having to change any cross-socket communication mechanism in the processor.

Also, at any moment in time the cache line may be evicted, which would mean that the data needs to be gathered from another core or re-logged. For example, if before ID[11], A0 had its cache line evicted, then A2 would get the value from A1. If both A1 and A0 were evicted, then processor A may need to log the cache line value into the trace for A2.

Finally, some processors may know that data comes from another socket, but not know which core in that socket. In those cases, the processor could log precedence (source) as a socket ID, log the data itself, or log the socket ID and a hash of the data (i.e., to help order cross socket accesses, but not have to log the entire data to the trace).

In a second example, the CCP uses indexes instead of tracking cache coherency of each core separately. In this environment, the index could be tracked cross socket or intra-socket. Due to the performance of cross socket versus intra-socket communications, the latter case (intra-socket) may be more practical. When the index is tracked intra-socket, the trace may need to log something when data moves cross socket. This could include logging the index from the other socket (but this may not necessarily be unique enough for a deterministic trace), logging a hash of one or more portions of the cache line value, or logging a packet on the sending socket's trace to indicate that data was sent.

When tracking core indexes when using a non-fully-inclusive cache, a complication arises when an L1 cache may have data that is not in the L3 cache. So, for example assume the following sequence of events: (i) A0 gets a line (thus the index bits refer to A0) in its L1 cache; (ii) A1 gets the line (thus the index bits refer to A1) in its L1 cache; (iii) L3 cache evicts the line; (iv) A1 evicts the line from its L1 cache; and (v) A2 gets the cache line from A0 in its L1 cache. Here, although A2 gets the cache line from A0, the index does not refer to A0. This complicates logging mappings into the trace. Some solutions could include adding extra information (as described above), such as a hash of one or more portions of the cache line data, periodically adding redundant information like a hash of the general-purpose registers, etc. Logging evictions could also help, but that may significantly grow the trace file size and complicate logging (e.g., logging L1 cache evictions that are not in the L2 or L3 caches, but not logging L1 cache evictions that are in the L2 or L3 caches).

In some embodiments, when data moves from an L3 cache to a child L2 or L1 cache, a log entry is only made if the index changes. For example, suppose that A0 has the line in its L1 cache (thus the index bits refer to A0), then A1 gets the line in its L1 cache (index at A1), then both evict the cache line but the common L2 (or L3) still has it. If the L2 cache serves A1, then there is nothing to log. If the L2 cache serves A0 then no log entry needs to be made if it is known that A0 already had the data; but if it is not known (or can't be determined) if A0 already had the data, then the processor may need to log a read->read.

Below is an example log of the operations of table 800b, assuming that sockets log independently, that tracking is performed by index, that there are no extra hidden evictions, and that all writes that impact the CCP and that happen when logging is turned on are logged (e.g., one write needs to be logged if there are consecutive writes by the same core and there is no access between the writes by another core or other external entity). For the second example, logging could include:

For ID[0], "0:A0:R[DATA]->[1]".

For ID[1], "1:B0:R[DATA]->[1]"—i.e., recall that each socket is logged separately.

For ID[2], "2:A1:R[A0]->R".

For ID[3], "3:A2:R[A1]->W".

For ID[4], nothing.

For ID[5], "5:B0:R[DATA]->[2]". This is because the write at ID[3] invalidated the line across all sockets, and sockets are being traced independently (as stated above).

For ID[6], "6:B1:R[B0]->R".

For ID[7], if the cache line for B0 hasn't been evicted there is nothing to log.

For ID[8]: "8:A0:R[A2]->W", since the logging bit is on (and despite this core not having logged the data before). This entry demonstrates how, with indexes, there is only knowledge of the last owner in the socket.

For ID[9], there is nothing to log.

For ID[10], "10:A1:W[A0]->R".

For ID[11], "11:A2:R[A1]->R".

For ID[12], "12:B0:R[data]->[4]". This is because the cache line was invalidated across all sockets at ID[8].

For ID[13], "13:B1:R[B0]->R".

For ID[14], "14:A0:R[A2]->R". Note that at ID[11] the index was updated to be A2. Also note that it would not be known that this core already had the data (i.e., ID[9]) since the index does not carry that information, while before the per-processor state (unit bits) was able to carry the information.

In a third example, the caches in environment 800a are unable to keep track of which core has the last shared (read) access to a cache line. Thus, in this example, the index of the last reader cannot be tracked, since there are no bits to do so. Here, the CCP may use one index value (that doesn't map to any core) to signal a shared line, another index value to signal an invalid line, and the processor index for a "modified" state (e.g., using an MSI protocol). In this third example, logging could include logging the index of the cache in a packet, instead of the index of the core. Parent to child movements need not be logged, but could be logged as extra data. If parent to child movements are not logged, then the parent to child cache hierarchy may need to be provided for the log to be interpreted.

As mentioned above, in some environments each cache line of a cache could include a single flag bit, but the CCP of the processor could track coherence state for each cache line, in reference to an index to a processing unit that owns the cache line's coherence state. As mentioned, this produces fully-deterministic traces, but may result in larger traces than in cases that have information per-processing unit (e.g., a CCP that tracks per processing unit, in combination with a flag bit per cache line). FIGS. 9A and 9B illustrate how logging may differ in these two situations (i.e., CCP unit information plus cache line flag bit versus CCP index plus cache line flag bit). FIG. 9A illustrates a table 900a that shows reads and writes by two processing units (P0 and P1), and FIG. 9B illustrates a table 900b that compares when log entries could be made in these two environments. In these examples, assume that the flag bit starts off cleared, and that the unit/index bits indicate that no processing unit has access to the cache line.

Initially, if the CCP tracks unit information and the cache line uses a flag bit, logging could proceed as follows. As shown in table 900b, at ID[O] nothing needs be logged, since it's a write on a cache line that has not been logged (alternatively, the value before the write could be logged, and the flag bit could be flipped on). At this point the CCP can note that neither P0 nor P1 access the cache line. At ID[1] the cache line data could be logged for P1. The flag bit could be turned on, and the CCP could note that P1 has access to the cache line. At ID[2] a read->read packet could be logged, with P0 taking the cache line from P1 (this is logged since the flag bit was on, and the CCP is used to determine that P0 did not have access). The flag bit was already on, and the CCP notes that P0 now also has access to the cache line's state. At ID[3] nothing needs be logged (the cache line is already in the log for this core). This determined because the flag bit is on, and the CCP indicates P1 already had access to the cache line. At ID[4] a read->write packet could be logged for P0. This because the flag bit is on, and P0 already had access to the cache line. Since this was a write, the CCP could invalidate the cache line for all other processors (i.e., P0 has access and P1 does not). At ID[5] a write->read packet could be logged for P1. This is because the flag bit is on, but P1 doesn't have the data in the trace (as indicated by the CCP). Note that the two reference packets at ID[4] and ID[5] are smaller than logging nothing at ID[4], and then having to log the data at ID[5]. The CCP notes that P1 now has access to the cache line, in addition to P0.

Now, if the CCP tracks index information only and the cache line uses a flag bit, logging could proceed as follows. As shown in table 900b, at ID[0] nothing needs to be logged since the flag bit is off and this is a write. As before, this may alternatively be logged as a read plus a write, if the memory is readable by P0. At ID[1] the cache line data could be logged for P1. The flag bit could be turned on, and the CCP and update the index to point to P1. At ID[2] a read->read packet could be logged for P0. This because the flag bit is already on and the index is on P1. The CCP can update the index to P0. At ID[3] a read->read packet could be logged for P1. Note that this case is now indistinguishable from ID[2], since in both cases the index on the other processor, the flag bit is on, and the cache line is in a shared state. The CCP can update the index to P1. At ID[4] a read->write packet could be logged for P0. The flag bit is on, so the packet can log by reference. This updates the CCP's index to P0. A ID[5] a write->read packet could be logged for P1. The flag bit is on, the packet logs by reference. The cache line moves to a shared state, so the CCP updates the index to P1. As shown in table 900b, the index case results in a larger trace file than the unit case, but still produces a fully-deterministic trace.

Some of the embodiments herein have indicated that it may be beneficial in terms of trace file size to record data packets that reference data possessed by another processing unit (when possible), rather than recording cache line data later (e.g., ID[4] in each of the preceding examples). Other benefits can also flow from recording by reference. For example, at replay, when there are a series of log entries that are by reference, it can be inferred that no external intervention happened in the cache line data. This is because when a full cache line data is re-logged, it means that either the cache line was evicted or invalidated. Thus, including log entries by reference, even in situations when a log entry may strictly not be necessary, can provide implicit information about the absence of external interventions that may be useful information at replay or for debugging.

In some implementations, the addresses that are recorded in the trace entries (e.g., the "@" entries above) comprise physical memory addresses. In these implementations, the processor 102 may record one or more entries of the TLB 102f into the trace file(s) 104d. This may be as part of the trace data streams for the different processing units, or as part of one more additional trace data streams. This will enable replay software to map these physical addresses to virtual addresses later.

In addition, since physical addresses may at times be considered "secret" information (e.g., when recording at the level of user mode), some embodiments record some representation of the actual physical addresses, rather than the physical addresses themselves. This representation could be any representation that uniquely maps its identifiers to physical addresses, without revealing the physical address. One example could be a hash of each physical address. When these representations are used, and entries of the TLB 102f are recorded into the trace file(s) 104d, the processor 102 records a mapping between these representations and virtual addresses, rather than physical addresses to virtual addresses.

As mentioned, the processor 102 can include one or more buffers 102e. These buffers can be used as a temporary storage location for trace file entries, prior to actually writing those entries to the trace file(s) 102f. Thus, when act 305 causes data to be logged to the trace, act 305 could comprise writing the data to the buffer(s) 102e. In some embodiments, the processor 102 employs deferred logging techniques in order to reduce impact of writing trace data on the processor 102 and the memory bus. In these embodiments, the processor 102 may store trace data into to the buffer(s) 102e, and defer writing to the trace file(s) 102f until there is available bandwidth on the memory bus, or the buffer(s) 102e is/are full. Some of these techniques are described in Applicant's co-pending application U.S. Ser. No. 15/688,828, filed Aug. 28, 2017 and titled "LOGGING TRACE DATA FOR PROGRAM CODE EXECUTION AT AN INSTRUCTION LEVEL," the entire contents of which are incorporated by reference herein in their entirety.

Figure 10A:
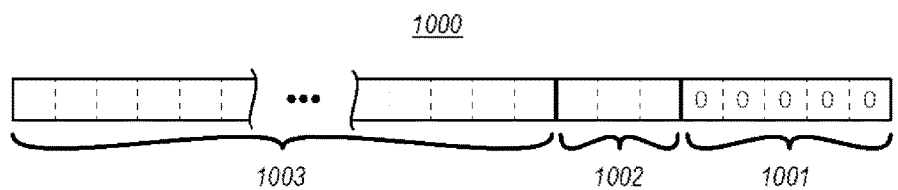
FIG. 10A illustrates an example of different parts of a memory address, and their relation to associative caches.
Figure 10B:
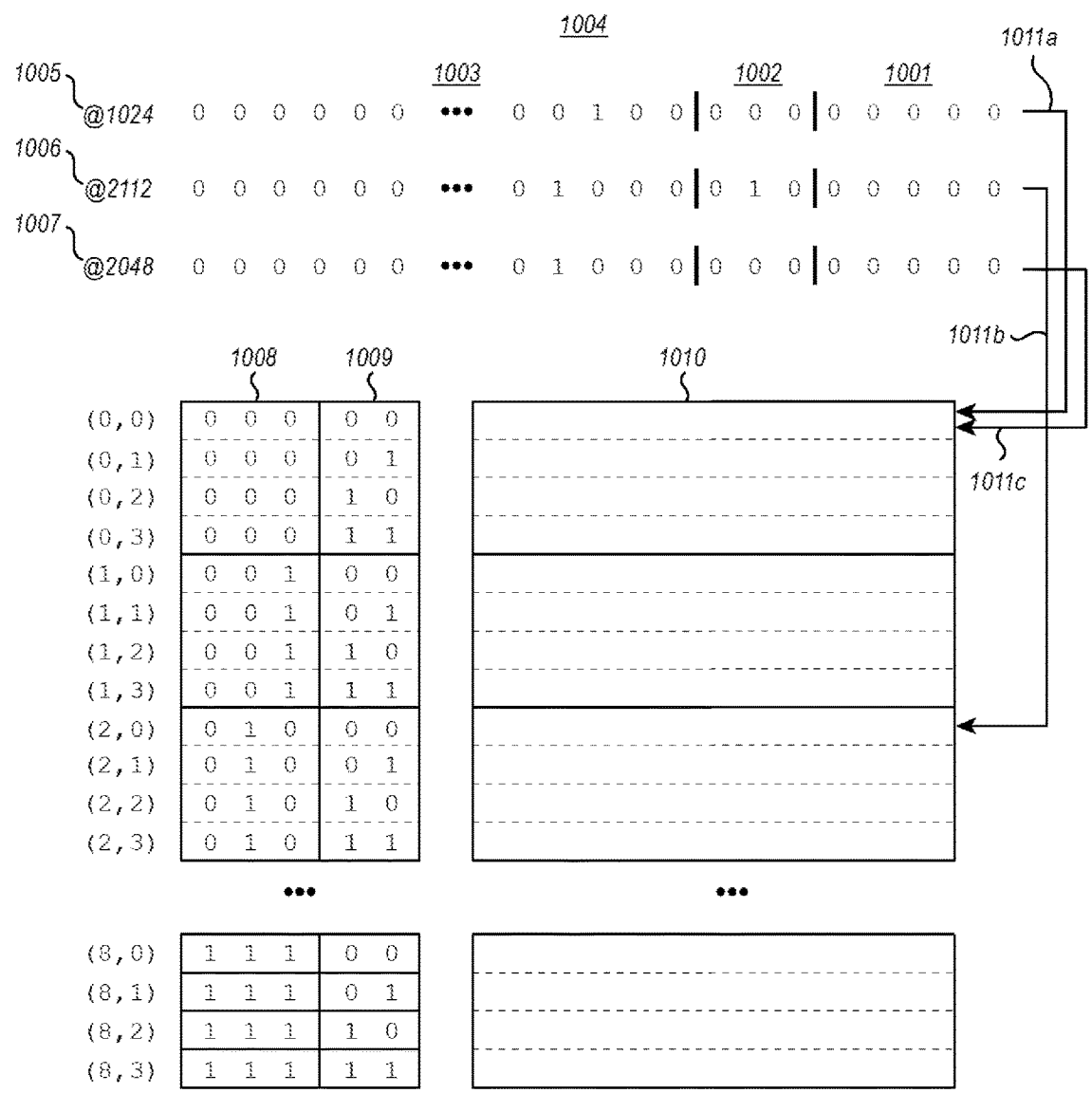
FIG. 10B illustrates an example of logging cache misses and cache evictions in an associative cache.

As was also mentioned, some embodiments may log cache evictions. FIGS. 10A and 10B illustrates some embodiments how cache evicting can be logged in an efficient manner (i.e., in terms of trace file size) leveraging properties of associative caches. Initially, FIG. 10A illustrates an example 1000 of different parts of a memory address, and their relation to associative caches. As shown, memory addresses include a first plurality of bits 1001 that are the low bits of the address, and that are typically zero. The first plurality of bits 1001 are zero because memory addresses are typically aligned to a memory address size (e.g., 32 bits, 64 bits, etc.). Thus, the number of the first plurality of bits 1001 is dependent on the size of the memory address. For example, if a memory address is 32 bits (i.e., $2^5$ bits), then the first plurality of bits 1001 comprises five bits (such that memory addresses are multiples of 32), if a memory address is 64 bits (i.e., $2^6$), then the first plurality of bits 1001 comprises six bits (such that memory addresses are multiples of 64), etc. Memory addresses also include a second plurality of bits 1002 that may be used by a processor 102 to determine a particular address group in an associative cache in which the data of the memory address should be stored. In the example 1000 of FIG. 10A, for instance, the second plurality of bits 1002 comprises three bits, which would correspond to an associative cache that has eight address groups. The number of the second plurality of bits 1002 is therefore dependent on the particular geometry of the associative cache. Memory addresses also include a third plurality of bits 1003 comprising the remaining high bits of the memory address.

In the context of FIG. 10A, FIG. 10B illustrates an example 1004 of logging cache misses and cache evictions in an associative cache. Initially, example 1004 shows three memory addresses 1005 (i.e., address 1024), 1006 (i.e., address @2112), and 1007 (i.e., address @2048). FIG. 10B also illustrates an associative cache 1010 that has eight groups, each comprising four ways. The binary identity of these groups and ways is shown in columns 1008 (groups) and 1009 (ways), along with a corresponding decimal representation in parentheticals. Thus, for example, the cache line (0, 0)—i.e., group 0, way 0—in cache 1010 is shown in binary as group '000' (column 1008) and way '00' (column 1009); the cache line (0, 1)—group 0, way 1—in cache 1010 is shown in binary as group '000' (column 1008) and way '01' (column 1009); and so on until the cache line (8, 3)—i.e., group 8, way 3—in cache 1010 is shown in binary as group '111' (column 1008) and way '11' (column 1009).

Now, suppose there is a first cache miss on address 1005 (i.e., @1024). Here, since its second plurality of bits 1002 is '000' the processor 102 may determine that it is to store the data corresponding to address 1005 in group 0 of cache 1010. The particular way in group 0 is typically chosen by processor-specific logic. For purposes of example 1004, however, suppose that the data is stored in way 0 (as shown by arrow) 1011a. In connection with this cache miss, log data recorded by the tracer 104a could include the memory address (i.e., @1024) and the way (i.e., way 0) in which the data was stored. Note that any number of compression techniques could be used to reduce the number of bits needed to store the memory address in the trace. The group (i.e., group 0) need not be logged because it can be obtained from the second plurality of bits 1002 of the memory address.

Next, suppose there is a second cache miss on address 1006 (i.e., @2112). This time, the second plurality of bits 1002 is '010' so the processor 102 may determine that it is to store the data corresponding to address 1006 in group 2 of cache 1010. Again, the particular way in group 2 is typically chosen by processor-specific logic. For purposes of example 1004, however, suppose that the data is stored in way 0 (as shown by arrow) 1011b. In connection with this cache miss, log data recorded by the tracer 104a could include the memory address (i.e., @2112) and the way (i.e., way 0) in which the data was stored. Again, the group (i.e., group 2) need not be logged because it can be obtained from the second plurality of bits 1002 of the memory address.

Now suppose there is a third cache miss on address 1007 (i.e., @2048). The second plurality of bits 1002 is again '000' so the processor 102 may determine that it is to store the data corresponding to address 1007 in group 0 of cache 1010. The particular way is again chosen by processor-specific logic, but suppose that the processor chose way 0 (as shown by arrow 1011c). In connection with this cache miss, log data recorded by the tracer 104a could include the memory address (i.e., @2048) and the way (i.e., way 0) in which the data was stored. Again, the group (i.e., group 0) need not be logged because it can be obtained from the second plurality of bits 1002 of the memory address.

Because this cache line (0,0) currently corresponds to address 1005, this third cache miss on address 1007 causes address 1005 to be evicted from cache 1010. However, embodiments may refrain from recording any trace data documenting this eviction. This is because the eviction can be inferred from data already in the trace—i.e., the first cache miss on address 1005 into way 0, together with the second cache miss on address 1007 into way 0. Even though the group (i.e., group 0) may not be expressly logged in the trace, it can be inferred from these addresses. As such, replay of this trace data can reproduce the eviction.

Some evictions result from events other than a cache miss. For example, a CCP may cause an eviction to occur in order to maintain consistency between different caches. Suppose, for instance, that address 1006 is evicted from cache line (2,0) of cache 1010 due to a CCP event. Here, the eviction can be expressly logged by recording the group (i.e., '010') and the way (i.e., '00') of the eviction. Notably, the address that was evicted need not be logged, since it was already captured when logging the second cache miss that brought address 1006 into cache line (2,0). Accordingly, in this example, the eviction can be fully captured in the trace file(s) 104d with a mere five bits of log data (prior to any form of compression).

Some embodiments are also capable of securely tracing activity of a processing unit, even when a thread executing at that processing unit interacts with a secure enclave. As will be appreciated by those of ordinary skill in the art, enclaves are hardware-based security features that can protect sensitive information (e.g., cryptographic keys, credentials, biometric data, etc.) from potentially even the lowest level software executing at a processor 102. Thus, in addition to protecting sensitive information from user-mode processes, enclaves may even protect sensitive information from kernels and/or hypervisors. In many implementations, enclaves appear to an executing process as encrypted portion(s) of memory mapped into the process' address space. This may be implemented, for example, by using different memory page tables for the executing process and the enclave. When a process interacts with an enclave, the process may read from/write to its own mapped memory, and the enclave may read from/write to its own mapped memory and/or the process' mapped memory.

First enclave-aware tracing embodiments trace an executing process, while refraining from tracing an enclave with which the process interacts, while still enabling the traced process to be fully replayed. In these embodiments, memory reads by the executing process to its address space are traced/logged using one or mechanisms already described herein. When there is a context switch to the enclave, however, embodiments may track any memory location(s) that were previously read by the traced process, and that are written to by the enclave during its execution. When the traced process again executes after the switch to the enclave, these memory location(s) are treated as having not been logged by the traced process. That way, if the traced process again reads from these memory location(s) (potentially reading data that was placed in those location(s) by the enclave) these reads are logged to the trace. Effectively, this means that any side effects of execution of the enclave that are visible to the traced process are captured in the trace, without needing to trace execution of the enclave. In this way, the traced process can be replayed later utilizing these side effects, without actually needing to (or even being able to) replay execution of the enclave. There are several mechanisms (described previously) that can be used to track memory location(s) that were previously read by the traced process and that are written to by the enclave during its execution, such as accounting bits (e.g., flag bits, unit bits, index bits), way-locking, use of CCP data, etc.

Second enclave-aware tracing embodiments trace the executing process (e.g., based on accesses, such as reads, to its own address space), while also tracing the enclave (e.g., based on accesses to its own address space and/or accesses to the traced process' address space). These embodiments could be implemented when there is a requisite level of trust between the kernel/hypervisor and the enclave. In these embodiments, trace data relating to execution of the enclave could be logged into a separate trace data stream and/or encrypted such that any entity performing a replay is unable to replay the enclave without access to the enclave's separate trace data stream and/or cryptographic key(s) that can be used to decrypt the trace data relating to execution of the enclave.

Third enclave-aware tracing embodiments combine the first and second embodiments. Thus, these third embodiments can record a trace of an executing process that includes the side-effects of that process' use of an enclave (i.e., the first embodiments), along with a trace of the enclave itself (i.e., the second embodiments). This enables execution of the traced process to be replayed by a user lacking a requisite privilege level and/or cryptographic key(s), while enabling a user having the requisite privilege level and/or cryptographic key(s) to also replay execution of the enclave itself.

Each of these enclave-tracing embodiments are applicable beyond enclaves, and to any situation in which a traced entity interacts with another entity whose execution needs to be protected during tracing (referred to now as a protected entity). For example, any of these embodiments could be used when tracing a user mode process that interacts with a kernel mode process—here, the kernel mode process could be treated much the same as an enclave. In another example, any of these embodiments could be used when tracing a kernel mode process that interacts with a hypervisor—here, the hypervisor could be treated much the same as an enclave.

There may be environments in which it is not practical (e.g., due to performance or security considerations), not possible (e.g., due to lack of hardware support), or not desirable to track which memory location(s) that were previously read by a traced process are written to by a protected entity during its execution. This could prevent use of the enclave-tracing embodiments described above. However, there are also techniques for tracing in these situations.

A first technique is to treat the processor cache as having been invalidated after the context switch from the protected entity. Treating the processor cache as having been invalidated causes reads by the traced entity after the return from the protected entity to cause cache misses—which can be logged. These cache misses will include any values that were modified in the traced entity's address space by the protected entity, and that were subsequently read by the traced entity. While this technique could generate more trace data than the three embodiments described above, it does capture the effects of execution of the protected entity that were relied on by the traced entity. In some embodiments, this first technique could also record one or more key frames (e.g., including a snapshot of processor registers) upon a return to a traced entity from a protected entity. The key frame(s) enable replay of the traced entity to be commenced after the return from the protected entity, even though there is a lack in continuity in trace data (i.e., during execution of the protected entity).

A second technique is to log the cache misses relating to reads by a protected entity from the traced entity's address space, as well as writes performed by the protected entity into the traced entity's address space. This allows a replay of the trace to reproduce the protected entity's writes without needing to have access to the instructions of the protected entity that produced them. This also gives replay access to the data (in the traced entity's address space) that the protected entity read, and which the traced entity later accessed. Hybrid approaches are possible (if sufficient bookkeeping information, such as CCP data, is available) that could log the protected entity's writes (in the traced entity's address space), but not its reads—if those reads would be logged later due to treating the cache as invalidated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing device, comprising:
   a plurality of processing units;
   a cache memory comprising a plurality of cache lines that are used to cache data from one or more backing stores and that are shared by the plurality of processing units, wherein consistency between data in the plurality of cache lines and the one or more backing stores is managed according to a cache coherence protocol (CCP); and stored control logic that configures the computing device to perform at least the following:
  determine that at least the following conditions have been met:
    (i) an operation has caused an interaction between a particular cache line of the plurality of cache lines and the one or more backing stores;
    (ii) logging is enabled for a particular processing unit of the plurality of processing units that caused the operation;
    (iii) the particular cache line is a participant in logging; and
    (iv) the CCP indicates that there is data to be logged to a trace based on the operation; and
  based at least on determining that the conditions having been met, cause the data to be logged to the trace, the data usable to replay the operation.

2. The computing device as recited in claim 1, wherein the stored control logic also configures the computing device to update one or more accounting bits associated with the particular cache line to indicate whether the particular cache line remains a participant in logging after the operation.

3. The computing device as recited in claim 2, wherein the one or more accounting bits associated with the particular cache line comprises one of (i) a single bit, (ii) a plurality of bits that each corresponds to one of the plurality of processing units, or (iii) a plurality of bits that store a processor index value.

4. The computing device as recited in claim 2, wherein the one or more accounting bits associated with the particular cache line are stored in one or more reserved cache lines that are separate from cache lines that are used to cache data from one or more backing stores.

5. The computing device as recited in claim 1, wherein causing the data to be logged to the trace comprises writing the data to a buffer, and wherein flushing data from the buffer to the trace file is deferred based on memory bus activity.

6. The computing device as recited in claim 1, wherein the stored control logic also configures the computing device to log at least one cache eviction by reference to a group and a way in an associative cache.

7. The computing device as recited in claim 1, wherein the data logged comprises transitions between different CCP states.

8. The computing device as recited in claim 1, wherein the data logged comprises at least one of: a transition from write state to a read state, a transition from a write state to a write state, or a transition from a read state to a write state.

9. The computing device as recited in claim 1, wherein using the CCP to identify that there is data to be logged to a trace comprises identifying that a transition from a read state to a read state need not be logged to the trace.

10. The computing device as recited in claim 1, wherein data for each processing unit is logged to at least one separate data stream.

11. The computing device as recited in claim 1, wherein data for two or more processing units is logged to the same data stream, but tagged with a processing unit identifier.

12. The computing device as recited in claim 1, wherein the data to be logged to the trace comprises ordering information.

13. The computing device as recited in claim 1, wherein the data to be logged comprises data written to the particular cache line by an enclave, and wherein causing the data to be logged to the trace comprises:
  when the operation that caused the interaction between the particular cache line and the one or more backing stores corresponds to a thread interacting with the enclave, causing the data to be logged into a trace data stream corresponding to the thread; or
  when the operation that caused the interaction between the particular cache line and the one or more backing stores corresponds to the enclave, causing the data to be logged to be separated from the trace data stream corresponding to the thread.

14. A method, implemented in a computing environment that includes a plurality of processing units and a cache memory comprising a plurality of cache lines that are used to cache data from one or more backing stores and that are shared by the plurality of processing units, wherein consistency between data in the plurality of cache lines and the one or more backing stores is managed according to a cache coherence protocol, the method for performing a cache-based trace recording using cache coherence protocol (CCP) data, the method comprising:
  determining that at least the following conditions have been met:
    (i) an operation has caused an interaction between a particular cache line of the plurality of cache lines and the one or more backing stores;
    (ii) logging is enabled for a particular processing unit of the plurality of processing units that caused the operation;
    (iii) the particular cache line is a participant in logging; and
    (iv) the CCP indicates that there is data to be logged to a trace based on the operation; and
  based at least on determining that the conditions having been met, causing the data to be logged to the trace, the data usable to replay the operation.

15. The method of claim 14, further comprising updating one or more accounting bits associated with the particular cache line to indicate whether the particular cache line remains a participant in logging after the operation.

16. The method of claim 14, wherein causing the data to be logged to the trace comprises writing the data to a buffer, and wherein flushing data from the buffer to the trace file is deferred based on memory bus activity.

17. The method of claim 14, wherein the data logged comprises transitions between different CCP states.

18. The method of claim 14, wherein the data logged comprises at least one of: a transition from write state to a read state, a transition from a write state to a write state, or a transition from a read state to a write state.

19. The method of claim 14, wherein using the CCP to identify whether data is to be logged to a trace comprises identifying that a transition from a read state to a read state need not be logged to the trace.

20. A computer program product for use at a computing device that comprises a plurality of processing units and a cache memory comprising a plurality of cache lines that are used to cache data from one or more backing stores and that are shared by the plurality of processing units, wherein consistency between data in the plurality of cache lines and the one or more backing stores is managed according to a cache coherence protocol (CCP), the computer program product comprising one or more hardware storage devices having stored thereon computer-executable instructions that are executable by one or more processing units to cause the computing device to perform at least the following:
  determine that at least the following conditions have been met:

(i) an operation has caused an interaction between a particular cache line of the plurality of cache lines and the one or more backing stores;
(ii) logging is enabled for a particular processing unit of the plurality of processing units that caused the operation;
(iii) the particular cache line is a participant in logging; and
(iv) the CCP indicates that there is data to be logged to a trace based on the operation; and based at least on determining that the conditions having been met, cause the data to be logged to the trace, the data usable to replay the operation.

* * * * *